(12) United States Patent
Post

(10) Patent No.: US 11,742,622 B2
(45) Date of Patent: Aug. 29, 2023

(54) REEL BASED OUTLET RELOCATION/EXTENSION SYSTEM

(71) Applicant: One-Eyed Pilot Innovations, Inc., Detroit, TX (US)

(72) Inventor: James Bradley Post, Detroit, TX (US)

(73) Assignee: One-Eyed Pilot Innovations, Inc., Detroit, TX (US)

( * ) Notice: Subject to any disclaimer, the term of this patent is extended or adjusted under 35 U.S.C. 154(b) by 0 days.

(21) Appl. No.: 17/200,062

(22) Filed: Mar. 12, 2021

(65) Prior Publication Data
US 2021/0376537 A1 Dec. 2, 2021

Related U.S. Application Data

(63) Continuation of application No. 16/034,897, filed on Jul. 13, 2018, now Pat. No. 10,950,990.

(60) Provisional application No. 62/651,465, filed on Apr. 2, 2018.

(51) Int. Cl.
| | | |
|---|---|---|
| *H01R 13/72* | (2006.01) |
| *H01R 25/00* | (2006.01) |
| *H01R 27/02* | (2006.01) |
| *H01R 43/18* | (2006.01) |
| *H01R 13/502* | (2006.01) |
| *H01R 13/70* | (2006.01) |
| *H01R 13/717* | (2006.01) |

(52) U.S. Cl.
CPC ........... *H01R 13/72* (2013.01); *H01R 25/006* (2013.01); *H01R 27/02* (2013.01); *H01R 43/18* (2013.01); *H01R 13/502* (2013.01); *H01R 13/701* (2013.01); *H01R 13/7175* (2013.01)

(58) Field of Classification Search
CPC .... H01R 13/72; H01R 13/502; H01R 13/701; H01R 13/7175; H01R 35/025; H01R 35/032; H01R 25/006; H01R 27/02; H01R 43/18
USPC .................................................. 439/501, 131
See application file for complete search history.

(56) References Cited

U.S. PATENT DOCUMENTS

| | | |
|---|---|---|
| 4,946,010 A | 8/1990 | Dibono |
| 5,562,488 A | 10/1996 | Neiser et al. |
| 5,700,150 A | 12/1997 | Morin |
| 5,700,158 A | 12/1997 | Neiser et al. |
| 9,517,841 B2 | 12/2016 | Ford |
| 10,950,990 B2 * | 3/2021 | Post ....................... H01R 27/02 |
| 2002/0123264 A1 | 9/2002 | Neiser |
| 2006/0286861 A1 | 12/2006 | Avevor et al. |
| 2011/0215759 A1 | 9/2011 | Lee et al. |
| 2012/0320546 A1 | 12/2012 | Wu |
| 2016/0006189 A1 | 1/2016 | Morehead |
| 2016/0164325 A1 | 6/2016 | Hinojosa et al. |
| 2016/0226279 A1 | 8/2016 | Anderson |
| 2018/0212386 A1 | 7/2018 | Nauertz |

* cited by examiner

*Primary Examiner* — Gary F Paumen
(74) *Attorney, Agent, or Firm* — Foley & Lardner LLP

(57) ABSTRACT

A power adapter may include a base wall mounted power adapter configured to be plugged into a wall power outlet and at least one extension adapter unit electrically coupled to the base wall mounted power adapter and configured to be extended away from the wall power outlet. The at least one extension adapter unit may include an electrical conduit reel configured to unravel in response to the at least one extension adapter unit being extended.

13 Claims, 21 Drawing Sheets

REEL BASED OUTLET RELOCATION/EXTENSION SYSTEM

CROSS-REFERENCE TO RELATED PATENT APPLICATIONS

This application is a continuation of U.S. patent application Ser. No. 16/034,897, filed Jul. 13, 2018, which claims priority to U.S. Provisional Patent Application No. 62/651,465, filed Apr. 2, 2018, each of which is incorporated by reference herein in its entirety.

FIELD OF THE INVENTION

The present invention relates to electrical outlets, and more specifically, to relocatable and extendable electrical outlets.

BACKGROUND OF THE INVENTION

Electrical outlets are one of the most components in a home because most of our lives revolve around the ability to supply power to our tools, games, and other electronic items. However, for aesthetic and safety purposes there is a limit to the quantity and density of outlets with commercial and residential buildings. As a result, access to electrical outlets is difficult and tethers our lives to certain locations in the building.

Electrical extensions have attempted to expand our travel beyond the length of our power cords. Electrical extensions bring their own access issues as they constantly fall into inaccessible locations, force us to search in tight locations for the end of the extension, limit the number of devices that can benefit from the extension, and limit the direction from the electrical outlet that we experience the freedom to the single direction that the electrical extension is run.

BRIEF SUMMARY OF THE INVENTION

One embodiment of a power adapter may include a base wall mounted power adapter configured to be plugged into a wall power outlet and at least one extension adapter unit electrically coupled to the base wall mounted power adapter and configured to be extended away from the wall power outlet. The at least one extension adapter unit may include an electrical conduit reel configured to unravel in response to the at least one extension adapter unit being extended.

One embodiment of a method of manufacturing a wall mounted power adapter, may include forming a first housing unit. A first electrical conduit may be included within the first housing unit. A second housing unit may be formed. An electrical conduit reel with a second electrical conduit supported thereby may be attached within the second housing unit, where the electrical conduit reel may enable the second electrical conduit to spool therefrom and outside the second housing unit. An outlet may be mechanically coupled to the second housing unit. A first end of the second electrical conduit may be electrically coupled to the first electrical conduit, and a second end of the second electrical conduit may be may be electrically coupled to the outlet coupled to the second housing.

One embodiment of a method of manufacturing a wall mounted power adapter may include forming a first housing unit and a second housing unit, inserting an electrical conduit reel into the second housing unit, electrically coupling a first end of the electrical conduit reel to the first housing and electrically coupling a second end of the electrical conduit reel to the second housing, and recessing a portion of the second housing unit configured to receive a connecting mechanism for connecting the second housing unit to wall.

One embodiment of a power adapter may include a base wall mounted power adapter and at least one extension adapter unit. The base wall mounted power adapter may include a first electrical conductor, an electrical plug electrically coupled to the first electrical conductor and configured to be plugged into a wall power outlet, and a first housing configured to house the first electrical conductor and support said electrical plug. The least one extension adapter unit may include a second electrical conductor electrically coupled to the first electrical conductor, an extension adapter socket configured to enable electrical plugs to be electrically connected thereto, an electrical conduit reel configured to circularly support the second electrical conductor, and enable the second electrical conductor to unravel from a first state to a second state in response to the at least one extension adapter unit being pulled away from the base wall mounted power adapter, and a second housing configured (i) to house the second electrical conductor and the electrical conduit reel, and (ii) to support the extension adapter socket.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

Figure 1:
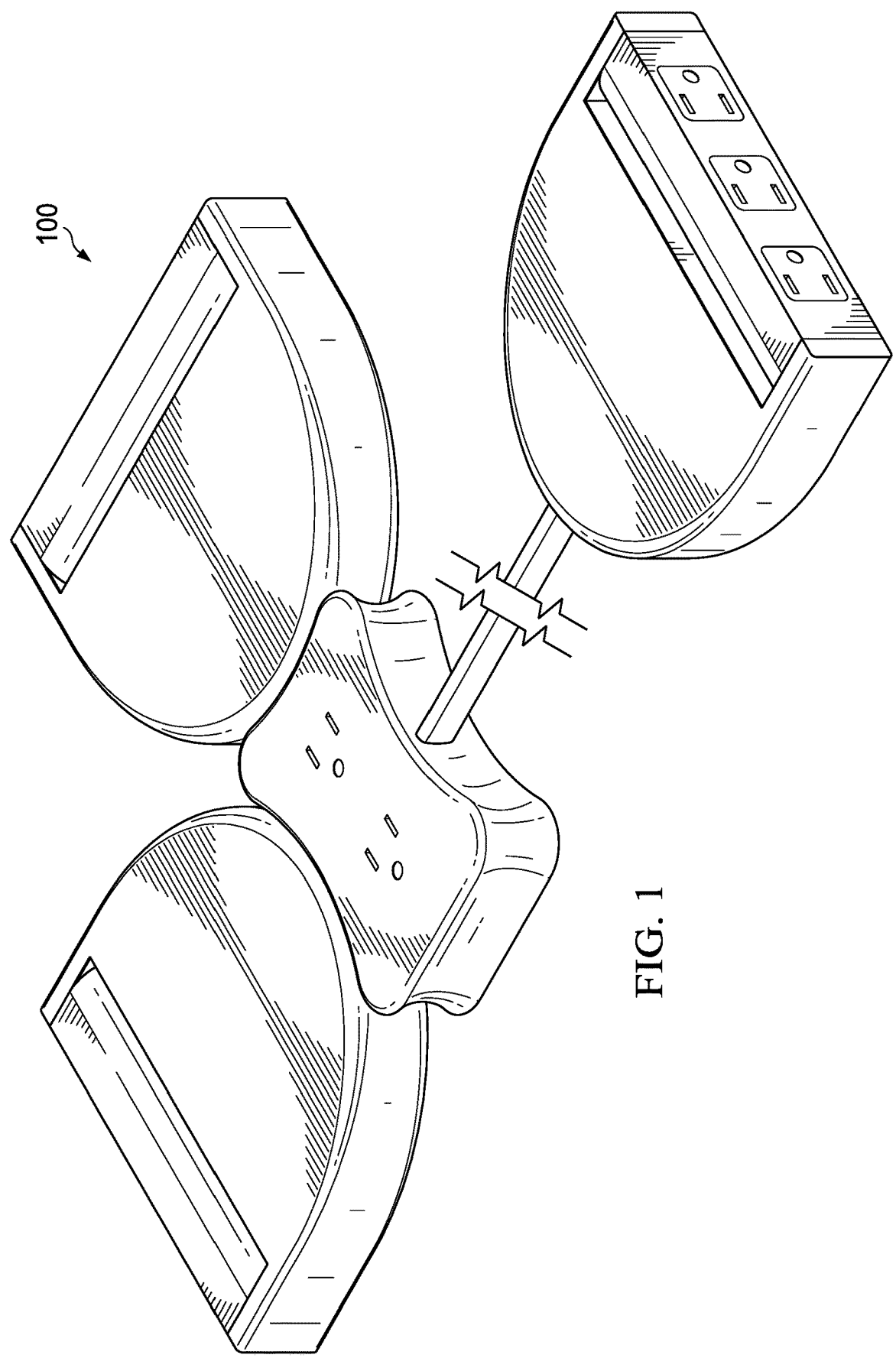
FIG. 1 is an illustration of an illustrative model of a relocatable/extendable power adapter.

With regard to FIG. 1, an illustration of an illustrative model of a relocatable/extendable power adapter 100 is shown. The power adapter 100 may be used for distributing electrical power to locations extended and/or relocated from an electrical outlet affixed to a wall in a building.

The power adapter 100 may be plugged into the electrical outlet and detachably coupled to alternative positions on the wall, or different walls. The power adapter may be configured to provide electrical power from the electrical outlet in the wall to a plurality of electronic devices at both the electrical outlet and the alternative positions. The power adapter 100 may be configured to include a housing with a profile that may be placed behind objects in the building.

Figure 2:
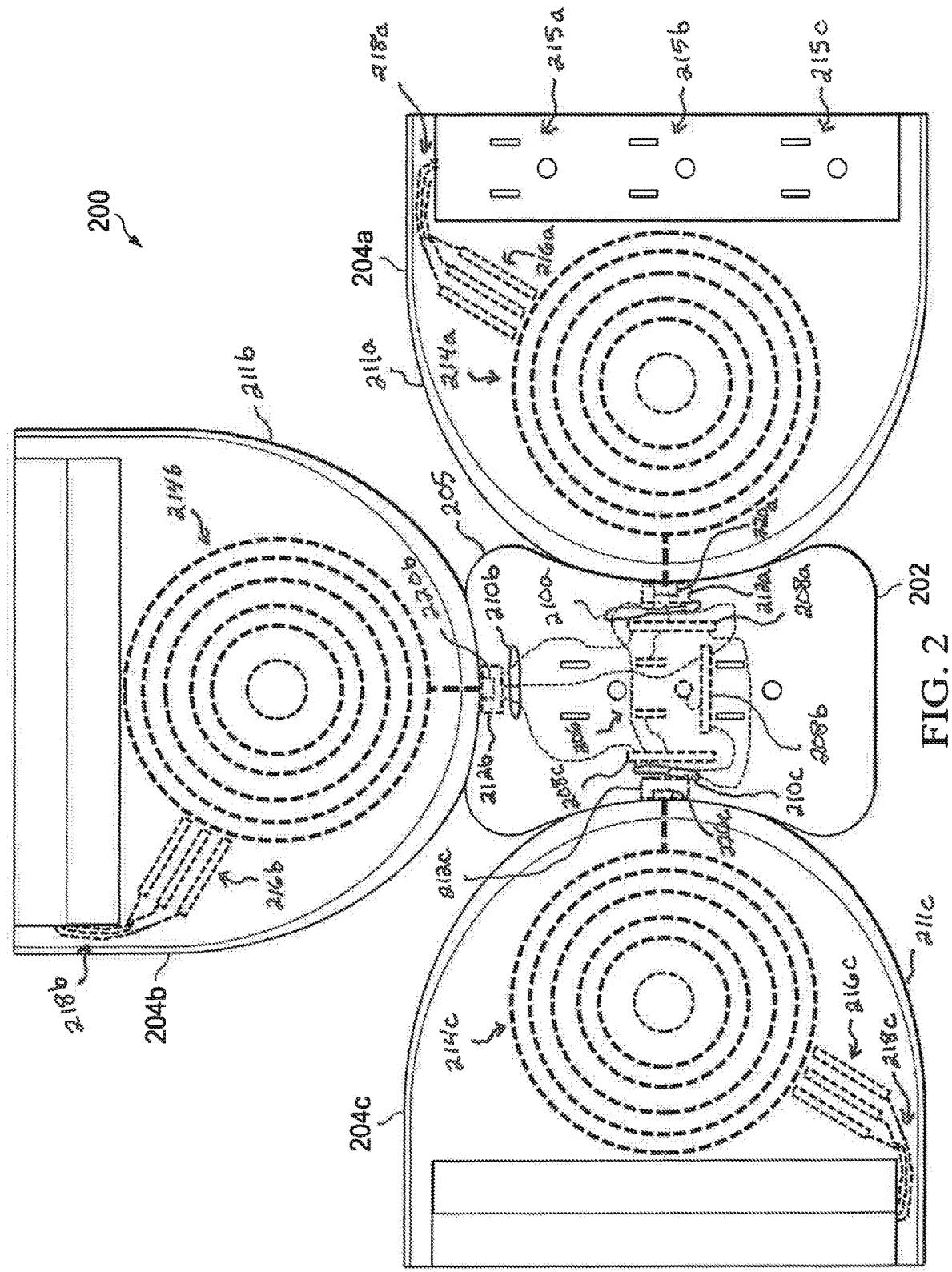
FIG. 2 is an illustration of an illustrative drawing of a relocatable/extendable power adapter.

With regard to FIG. 2, an illustration of an illustrative drawing of a relocatable/extendable power adapter 200 is shown. The power adapter 200 may include a base wall mounted power adapter 202 and at least one extension adapter unit 204a-204c (collectively 204).

The base wall mounted power adapter 202 may include a housing 205, at least one electrical plug 206 (shown as dashed lines as the electrical plug 206 extend from the other side of the housing 205 to be plugged into a wall socket), electrical blocks 208a-208c (collectively 208), and at least one electrical conductor 210a-210c (collectively 210), and at least one coupled to the electrical plug(s) 206 electrically coupled to the electrical conductor. The electrical conductor(s) 210 conduct plus, minus, and ground electrical potentials provided by an electrical wall outlet, as understood in the art. The electrical plugs) 206 may be configured to be plugged into the wall electrical outlet, as also understood in the art. The housing 205 may be configured to house the first electrical conductor(s) 210 and support the electrical plug(s) 206. Electrical plugs 212a-212c (collectively 212) may be connected to the electrical conductor(s) 210).

Figure 13:
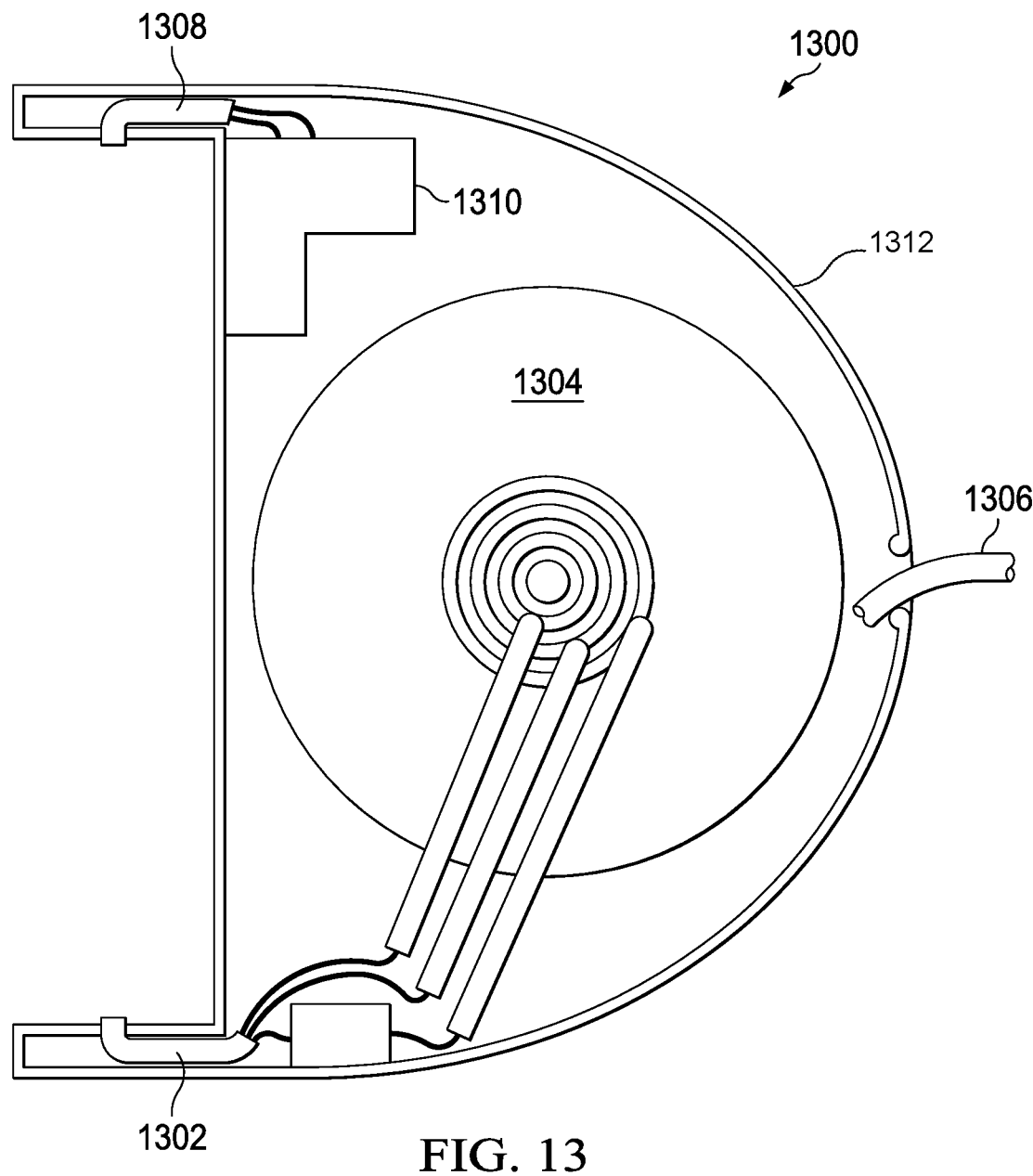
FIG. 13 is an illustration of an illustrative drawing of an electrical conduit reel system of a relocatable/extendable power adapter.
Figure 14A:
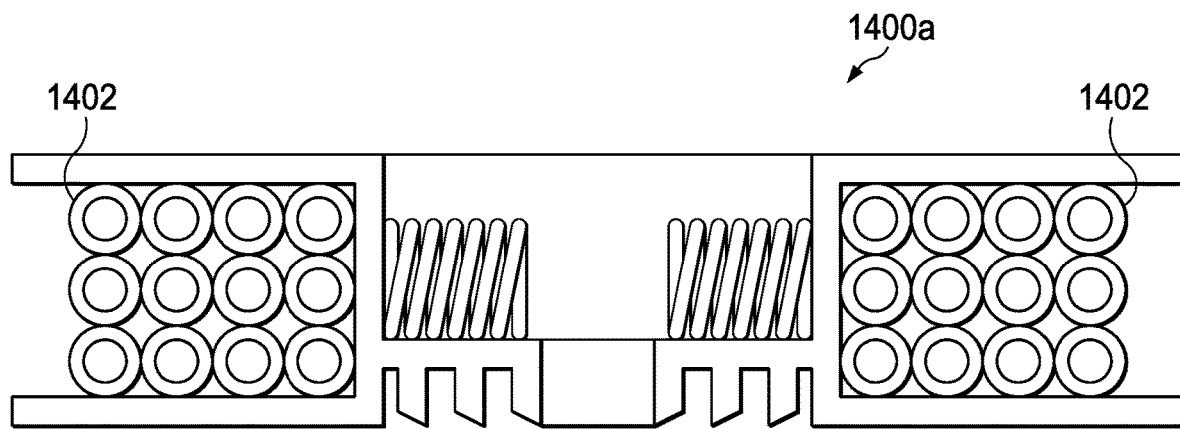
FIGS. 14A-14C are illustrations of an illustrative drawing of an electrical conduit reel system of a relocatable/extendable power adapter.
Figure 14B:
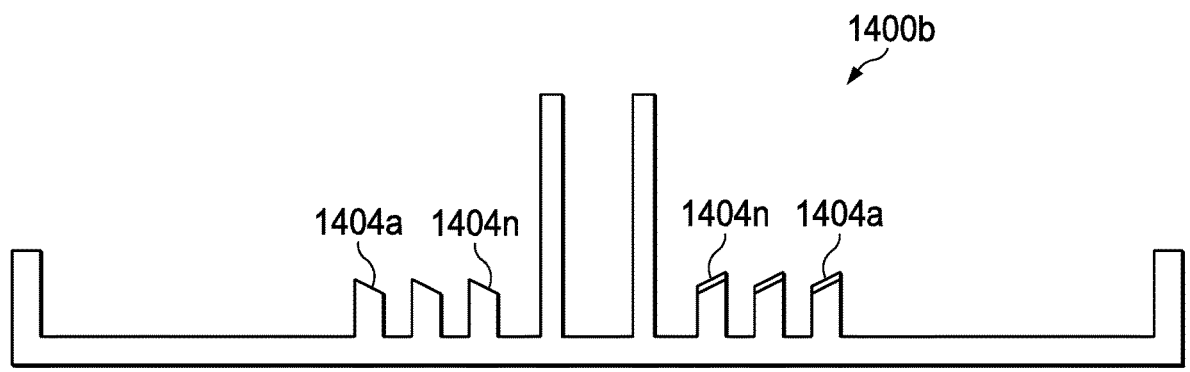
Figure 14C:
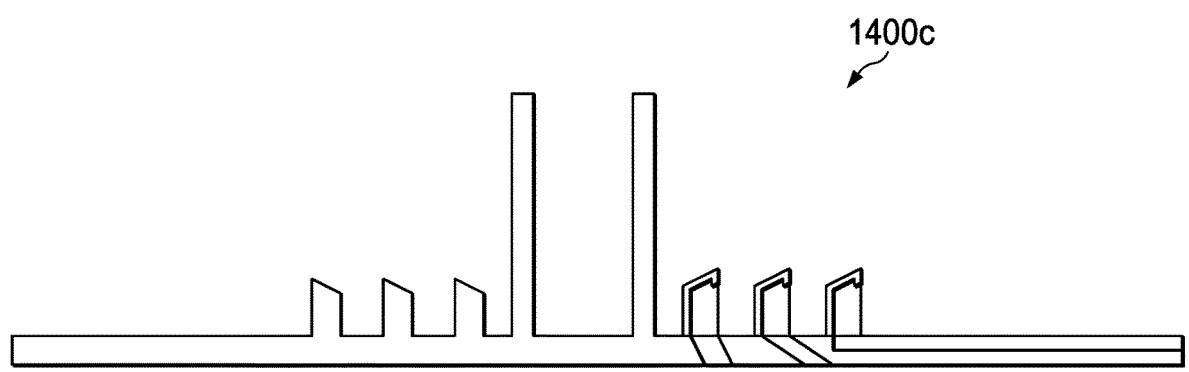
Figure 15:
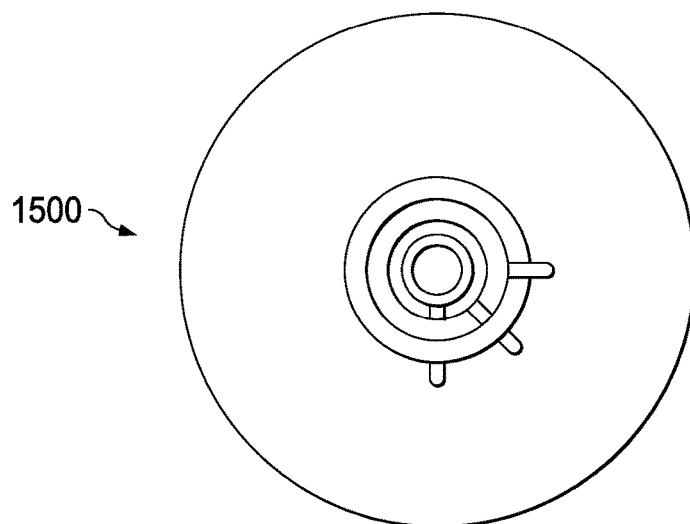
FIG. 15 is an illustration of an illustrative drawing of an electrical conduit reel system of a relocatable/extendable power adapter.

Each of the extension adapter units 204a, 204b, and 204c may include a housing 211a-211c (collectively 211) (see also, for example, FIG. 4c, 406b or 406c and FIG. 13, 1312), at least one electrical conductor 214a-214c (collectively 214) (see also, for example, FIG. 14a, 1402), an extension adapter socket 215a-215c (collectively 215) (see also, for example, FIG. 11a, 1102a-1102n), and an electrical conduit or conductor reel on which the electrical conductor(s) 214 are retained (see, for example, FIG. 13, 1304). The electrical conductor(s) 214 of the extension adapter unit(s) 204 may be electrically coupled to the electrical conductor(s) 210 of the base wall mounted power adapter 202. The extension adapter socket(s) 215 may be configured to enable an electrical plug of an electrical device (e.g., phone charger, not shown) to be electrically connected thereto. The housing(s) 211 of the extension adapter unit(s) 204 may be configured to house the electrical conductor 214 and the electrical conductor reel. The housing 211 of the extension adapter unit(s) 204 may be further configured to support the extension adapter socket(s) 215. By way of nomenclature of the relocatable/extendable power adapter 200, the housing 205 of the base wall mounted power adapter 202 may be considered a first housing, the housing 211a of a first extension adapter unit 204a may be considered a second housing, the housing 211b of a second extension adapter unit 204b may be considered a third housing, and so on. Similarly, the electrical conductors 210 of the base wall mounted power adapter 202, electrical conductor(s) 214a of the first extension adapter unit 204a, and electrical conductors(s) 214b of the second extension adapter unit 204b may be considered first, second, and third electrical conductors, respectively. Electrical pickoffs 216a-216c may include positive, negative, and ground electrical conductors that conduct electricity from the electrical conductors 214 to electrical conductors 218a-218c for supplying electricity from the electrical conductors 214 to electrical sockets, such as sockets 215, for each of the respective extension adapter units 214. Electrical connectors 220a-220c (see electrical connector in FIG. 11a also) may connect into the electrical connectors 212a-212c. As provided in FIG. 1, the electrical connectors 212 may be disposed within the housing 205 of the base wall mounted adapter 202 and the electrical connector 220 may be connected to the electrical connectors 212 via an aperture in a sidewall of the housing 205 or directly to the electrical connector 212 if mounted on the sidewall of the housing 205.

Figure 3:
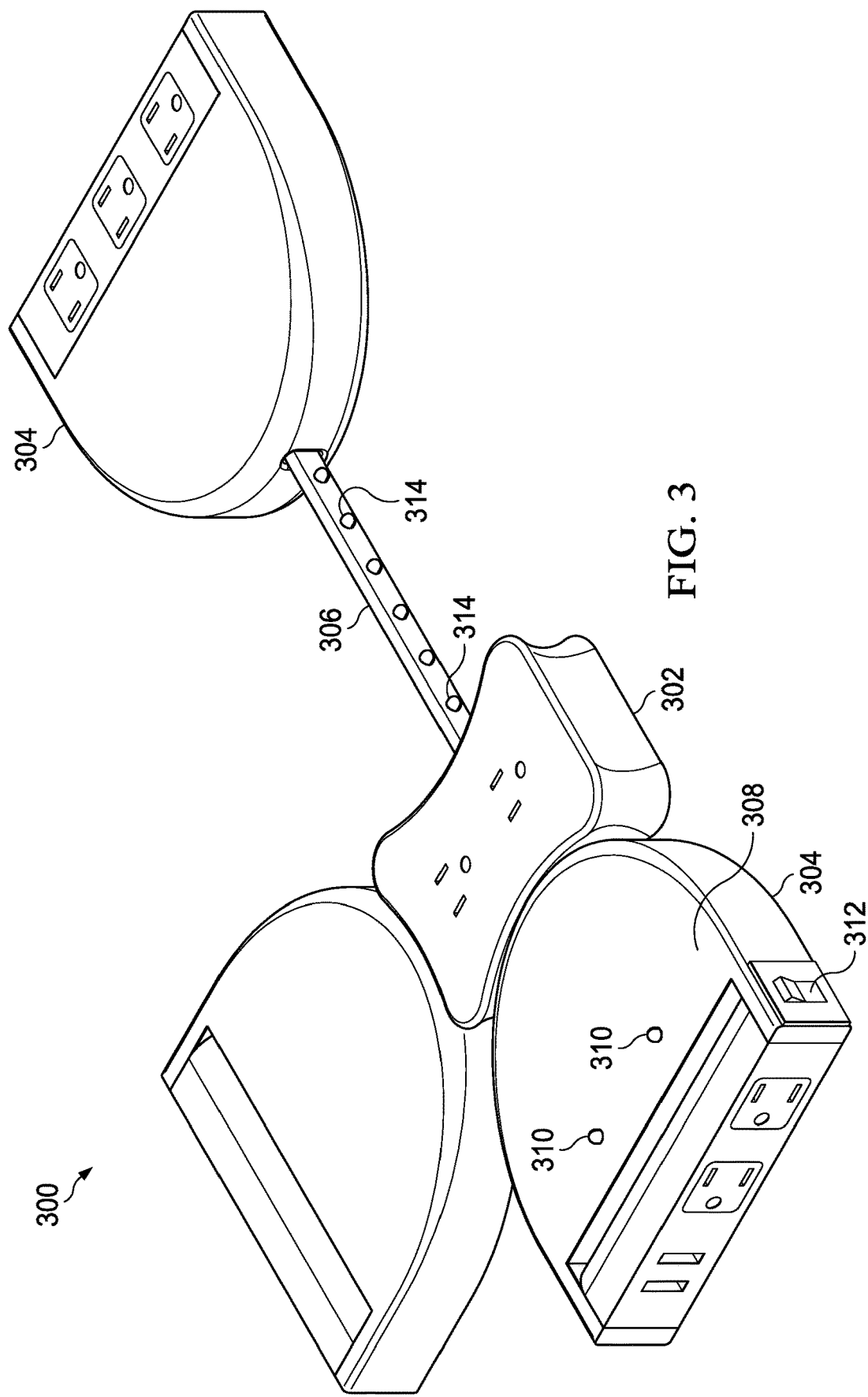
FIG. 3 is an illustration of an illustrative drawing of a relocatable/extendable power adapter.

With regard to FIG. 3, an illustration of an illustrative drawing of a relocatable/extendable power adapter 300 is shown. The power adapter 300 may include a base wall mounted power adapter 302 and at least one extension adapter unit 304. In an embodiment, one or more of the extension adapter units 304 may have a handle or ridge that may enable a user to more easily grip the extension adapter unit(s) 304 when extending the unit(s) 304 from the base wall mounted power adapter 302.

The at least one extension adapter unit 304 may include an electrical conductor 306 and an electrical conduit reel (as described hereinbelow with reference to FIGS. 13-17C). The electrical conduit reel may be configured to circularly support the electrical conductor 306. The electrical conduit reel may be further configured to enable the electrical conductor 306 to unravel from a first state to a second state in response to the extension adapter unit 304 being pulled away from the base wall mounted power adapter 302. The electrical conductor 306 may be fixedly attached (e.g., soldered, connected to an electrical block, or otherwise attached) within the base wall mounted power adapter 302. In an alternative embodiment, the electrical conductor 306 may have an electrical connector (e.g., plug) that may connect into a mating electrical connector (e.g., socket), as understood in the art, on the base wall mounted power adapter 302 and/or the extension adapter unit 304, thereby allowing for extension adapter unit(s) 304 to be acquired separate from the adapter 302 and added after installation of the adapter 302.

In an embodiment, a portion or all of the housing 308 of one or more components of the power adapter 300 may be transparent (e.g., clear plastic), translucent (e.g., semi-clear plastic in any color or multiple colors), or opaque (e.g., solid white). In an embodiment, one or more of the extension adapter units 304 extending from a base wall mounted power adapter 302 may have at least a portion of the housing being translucent. In another embodiment, one or more illumination devices 310, such as light emitting diodes (LEDs) mounted to and powered by one or more of the extension adapter unit, may be configured to illuminate when power is available thereat. The illumination device may be positioned within the housing such that when illuminated, a clear or translucent housing allows for the illumination to pass therethrough. In an alternative embodiment, the illumination device may be positioned on an outside portion of the housing. In an embodiment, a current sensor may be configured to illuminate the illumination device in response to a device being plugged into the extension adapter unit. In another embodiment, a switch 312 may be positioned on any of the components of the power adapter 300, and be configured to enable a user to turn on or off the illumination device, thereby acting as a nightlight. In yet another embodiment, a light sensor may be configured to sense when ambient light is below a certain level, and cause the illumination device to turn on, and in response to sensing when the ambient light is above a certain level, to turn off the ambient light.

If the device is a rechargeable device, such as a rechargeable battery of a mobile phone, then the illumination device may be configured to generated different colors (e.g., blue, white, green, yellow) depending on whether the rechargeable device is powered or not (e.g., if current is flowing or not). In such a configuration, the socket may be a conventional adapter, such as a USB port, as understood in the art, that is capable of causing the illumination device to be illuminated. In another embodiment, the electrical conductor 306 that extends between the base power adapter and extension adapter unit may include one or more illumination devices 314, such as LEDs, that are configured to operate in the same or similar manner as the illumination device positioned on the extension adapter unit.

In an embodiment, an extra extension unit that may or may not have outlets, and may serve to increase the overall distance the extendable unit could reach may be utilized. The extra extension unit may essentially operate as an extension cord that allows for additional distance (e.g., 6-10 feet) of the extension adapter unit 304. The extra extension unit may include an adapter configured to enable the electrical conductor 306 to connect thereto, if disconnectable from the extension adapter unit 304 or base wall mounted power adapter 302. In an embodiment, instead of connecting to the power adapter 302, the extendable unit could connect to another accessory, which may also mount to the wall. Alternatively, the extension unit may connect to the hub. The extendable unit may include a pair of adapters, one on each end of an electrical conductor. In an embodiment, the electrical conductor may be contained within a housing and spooled outward from each end, thereby allowing for a consistent look with the extension adapter unit 304 and power adapter 302.

Figure 4A:
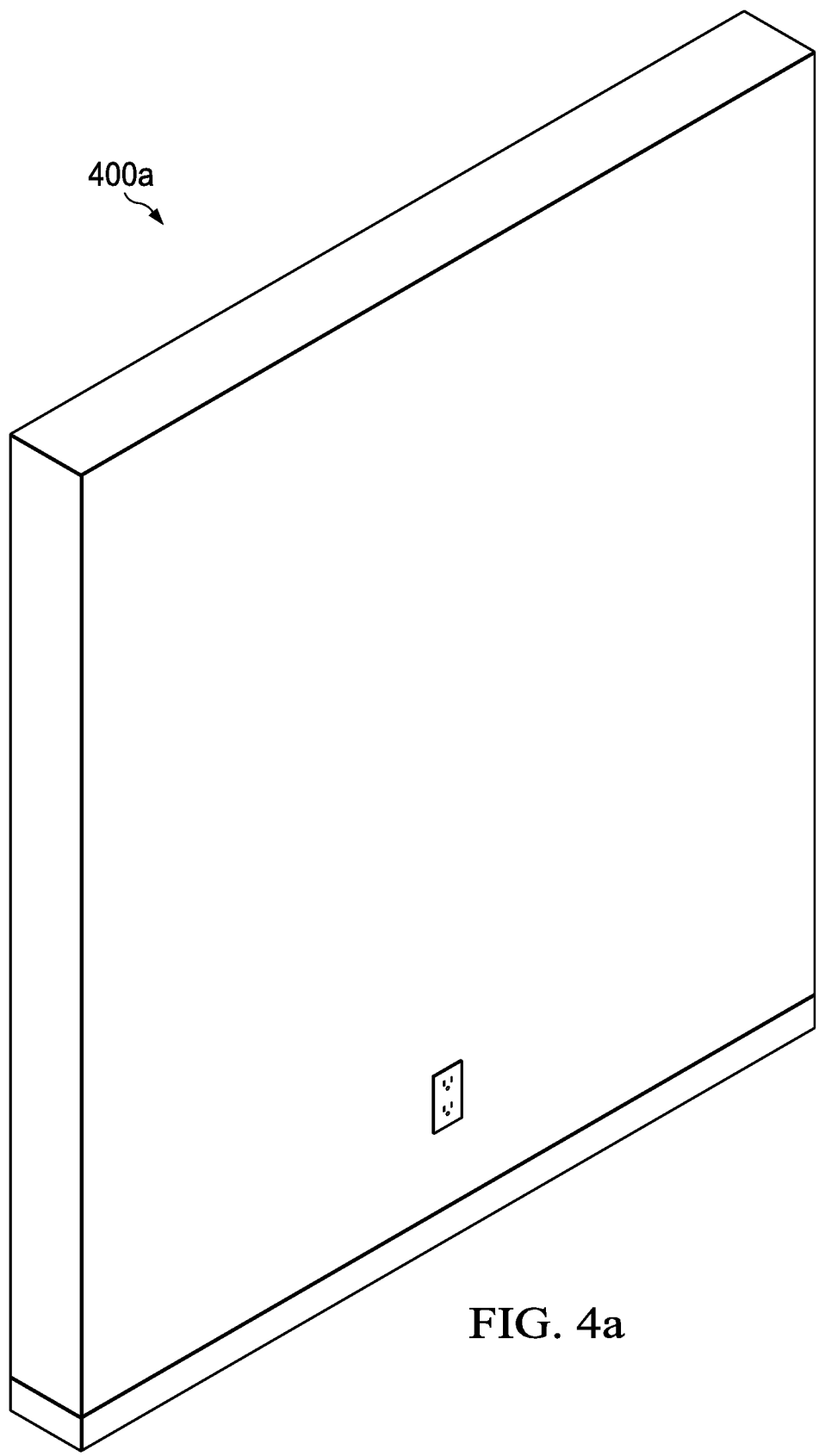
FIGS. 4A-4C are illustrations of an illustrative drawing of a relocatable/extendable power adapter system behind an object in a room.
Figure 4B:
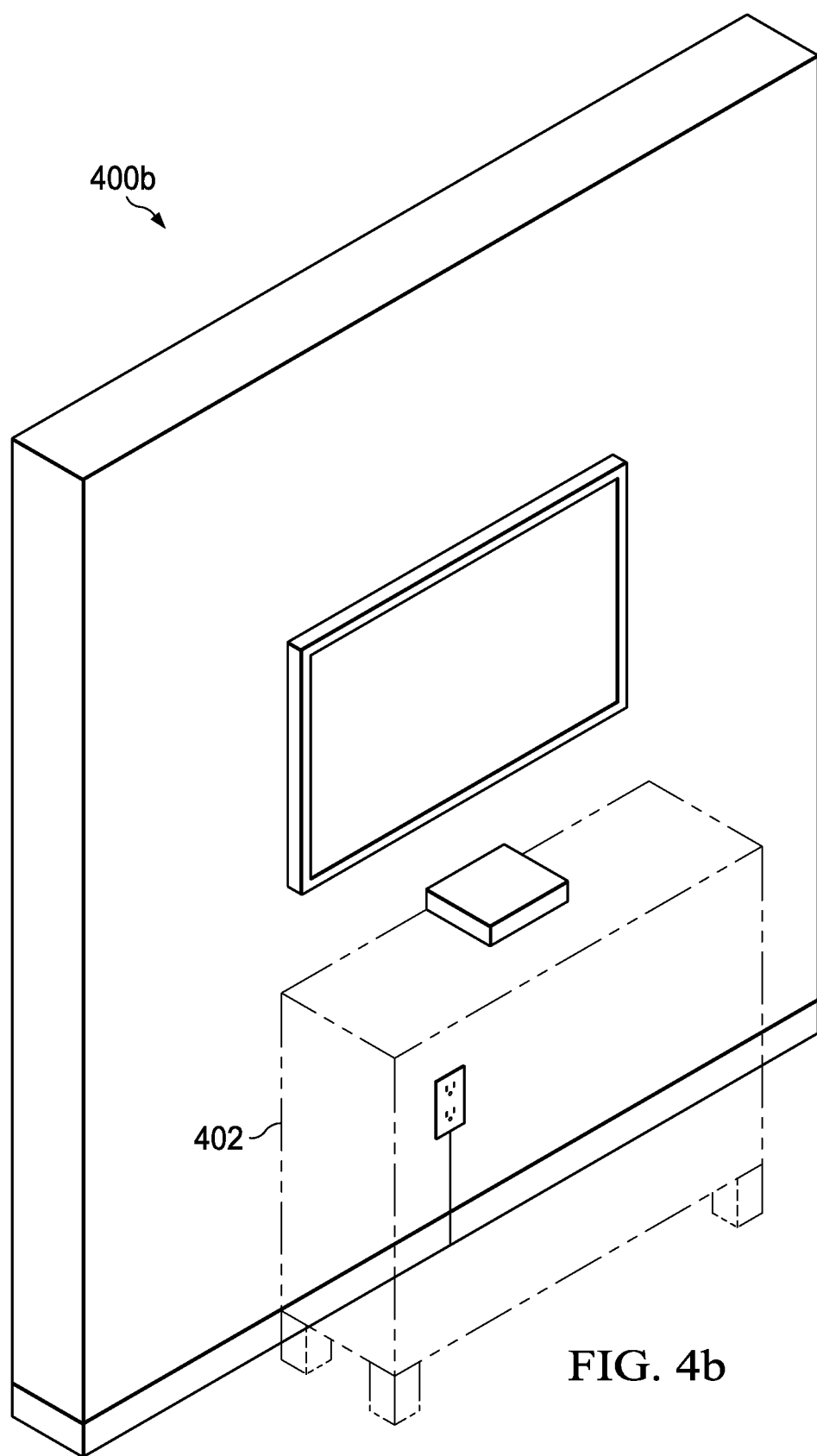
Figure 4C:
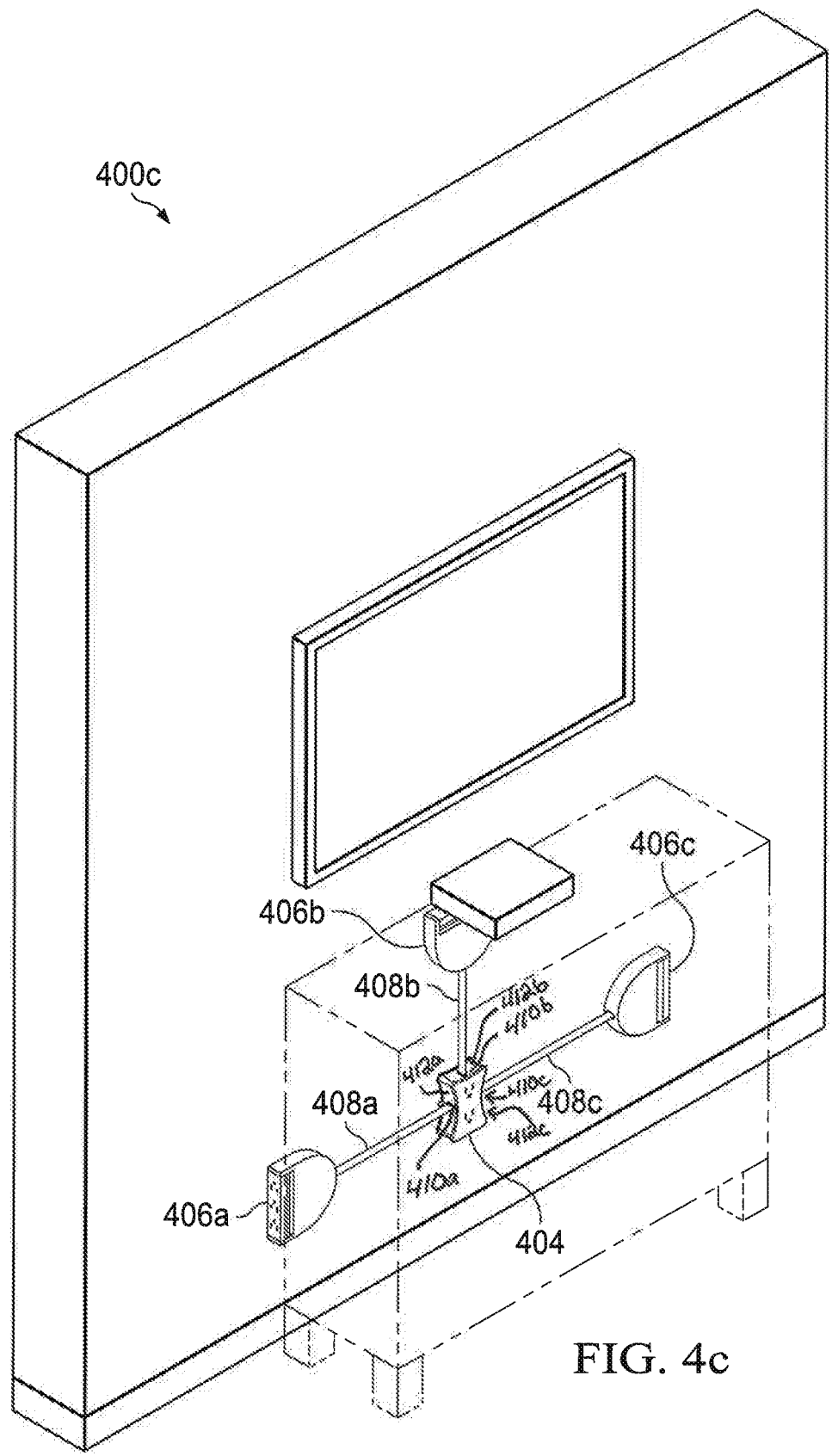

With regard to FIGS. 4A-4C, illustrations of an illustrative drawing of a relocatable/extendable power adapter system in a room 400*a*-400*c* (collectively 400) and behind an object 402 are shown. The power adapter system may include a base wall mounted power adapter 404 and at least one extension adapter unit 406*a*-406*c* (collectively 406).

The at least one extension adapter unit 406 may be electrically coupled to the base wall mounted power adapter 404 by an electrical conductor 408*a*-408*c* (collectively 408). The electrical conductor 408 may be the electrical conductor 306 of FIG. 3 as described hereinabove. The at least one extension adapter unit 406 may be enable a user to pull and mount the at least one extension adapter unit 406 so that it is more easily accessed behind the object 402. In one embodiment, the at least one extension adapter unit 406 may be configured to be mounted behind an edge of the object 402 so the user does not have to reach behind the object 402 to access an electrical outlet located at the base wall mounted power adapter 404.

Figure 5:
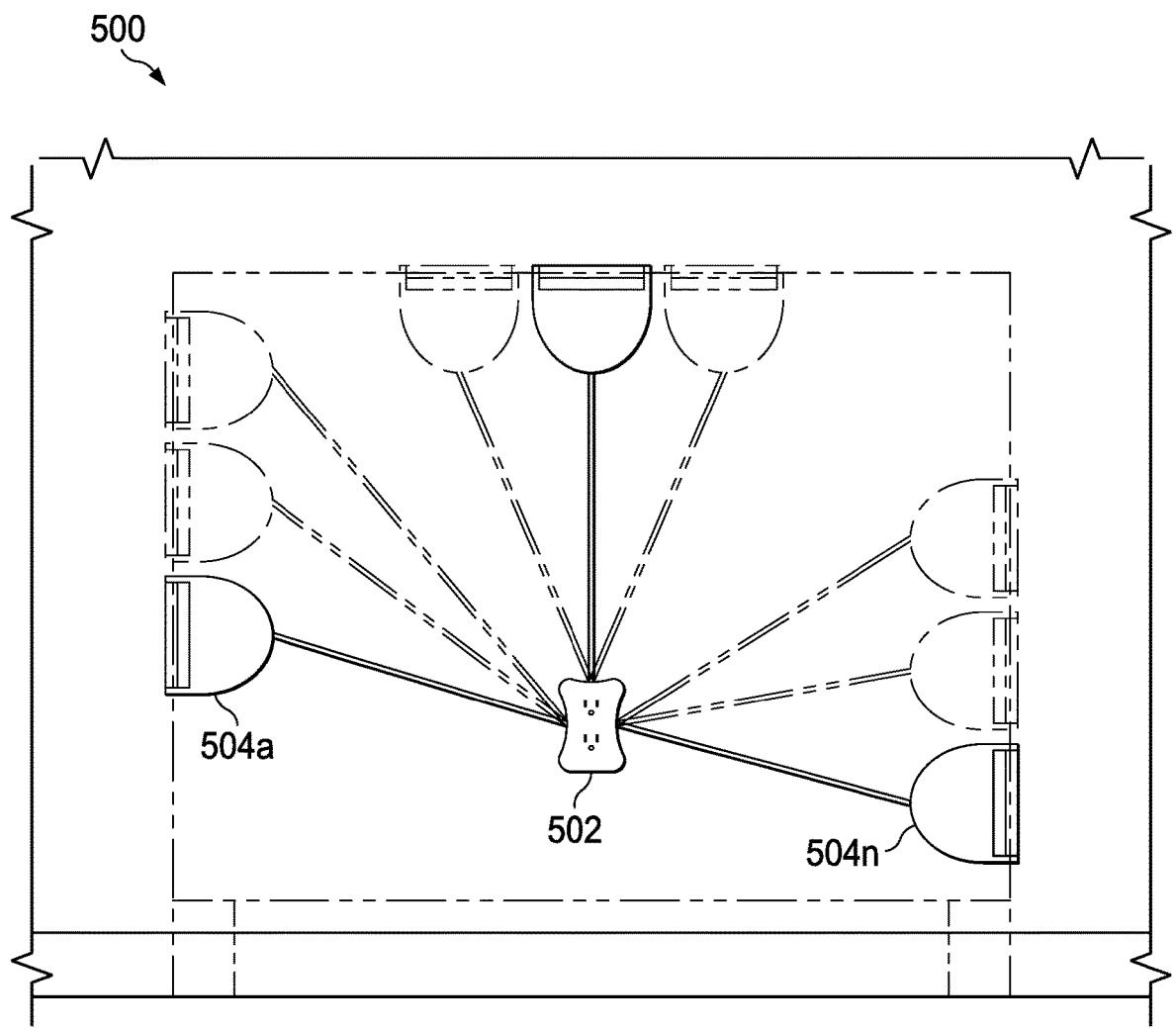
FIG. 5 is an illustration of an illustrative drawing of a maneuverability of a relocatable/extendable power adapter.

With regard to FIG. 5, an illustration of an illustrative drawing of a maneuverability of a relocatable/extendable power adapter 500 is shown. The power adapter 500 may include a base wall mounted power adapter 502 and at least one extension adapter unit 504*a*-504*n* (collectively 504).

The at least one extension adapter unit 504 may be configured to be pulled in a plurality of directions and/or distances away from the base wall mounted power adapter 502 so that a user may place the at least one extension adapter unit 504 in a location that is easily accessible by the user.

Figure 6:
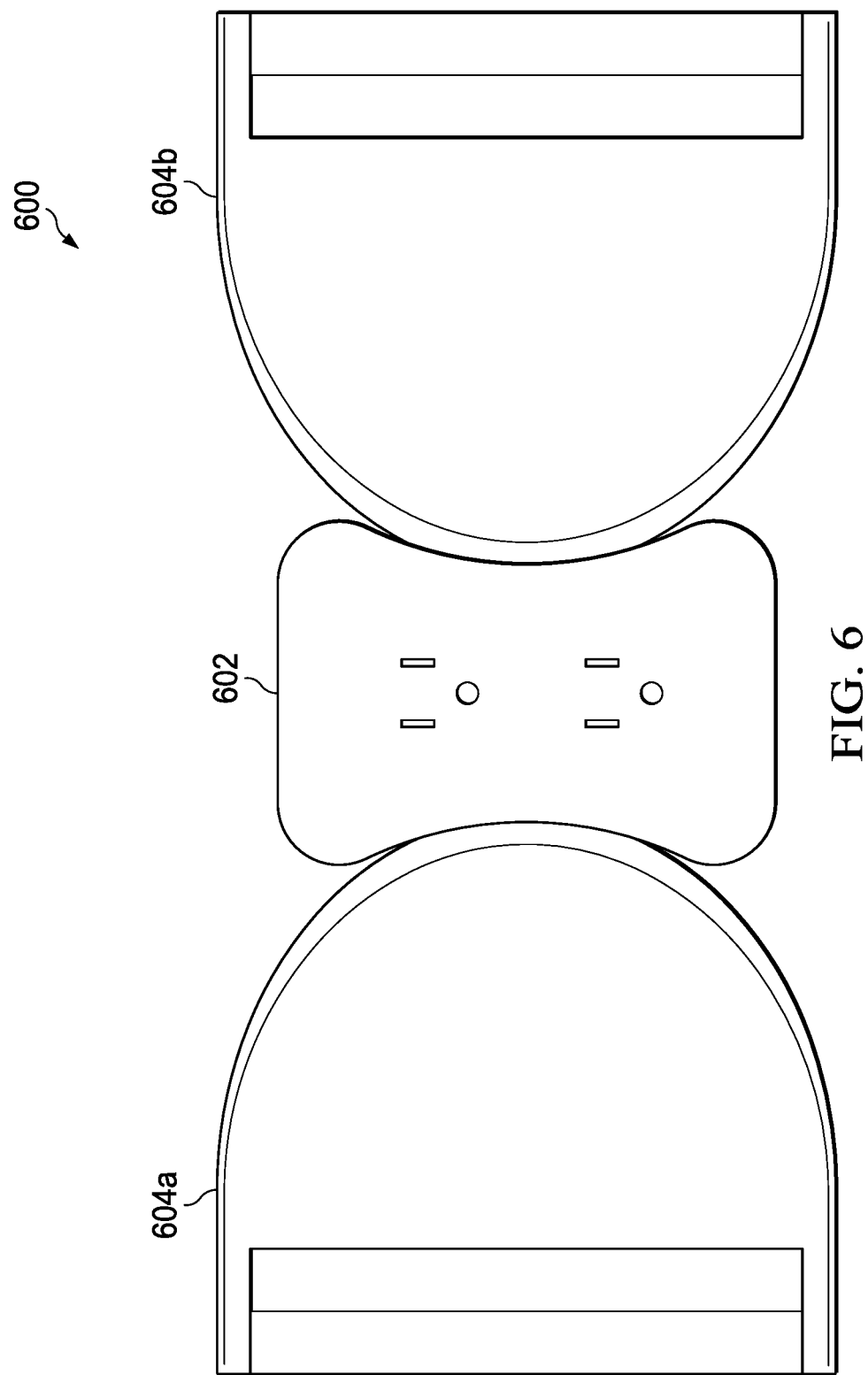
FIG. 6 is an illustration of an illustrative drawing of a relocatable/extendable power adapter.

With regard to FIG. 6, an illustration of an illustrative drawing of a relocatable/extendable power adapter 600 is shown. The power adapter 600 may include a base wall mounted power adapter 602 and at least one extension adapter unit 604*a* and 604*b* (collectively 604).

In one embodiment, the at least one extension adapter unit 604 may include two extension adapter units. In one embodiment, the at least one extension adapter unit 604 may include three extension adapter units as shown hereinabove with regard to FIGS. 1-5.

Figure 7:
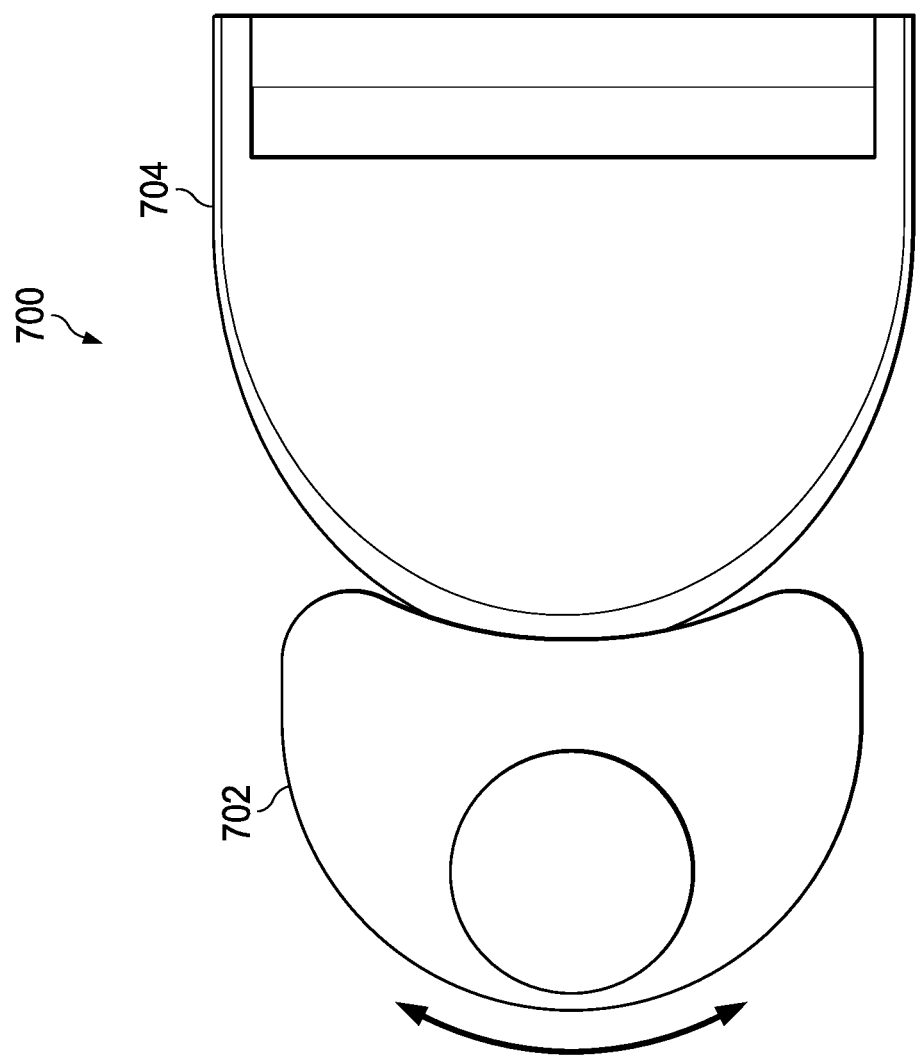
FIG. 7 is an illustration of an illustrative drawing of a relocatable/extendable power adapter.

With regard to FIG. 7, an illustration of an illustrative drawing of a relocatable/extendable power adapter 700 is shown. The power adapter 700 may include a base wall mounted power adapter 702 and an extension adapter unit 704. In one embodiment, the power adapter 700 may include one extension adapter unit 704.

Figure 8:
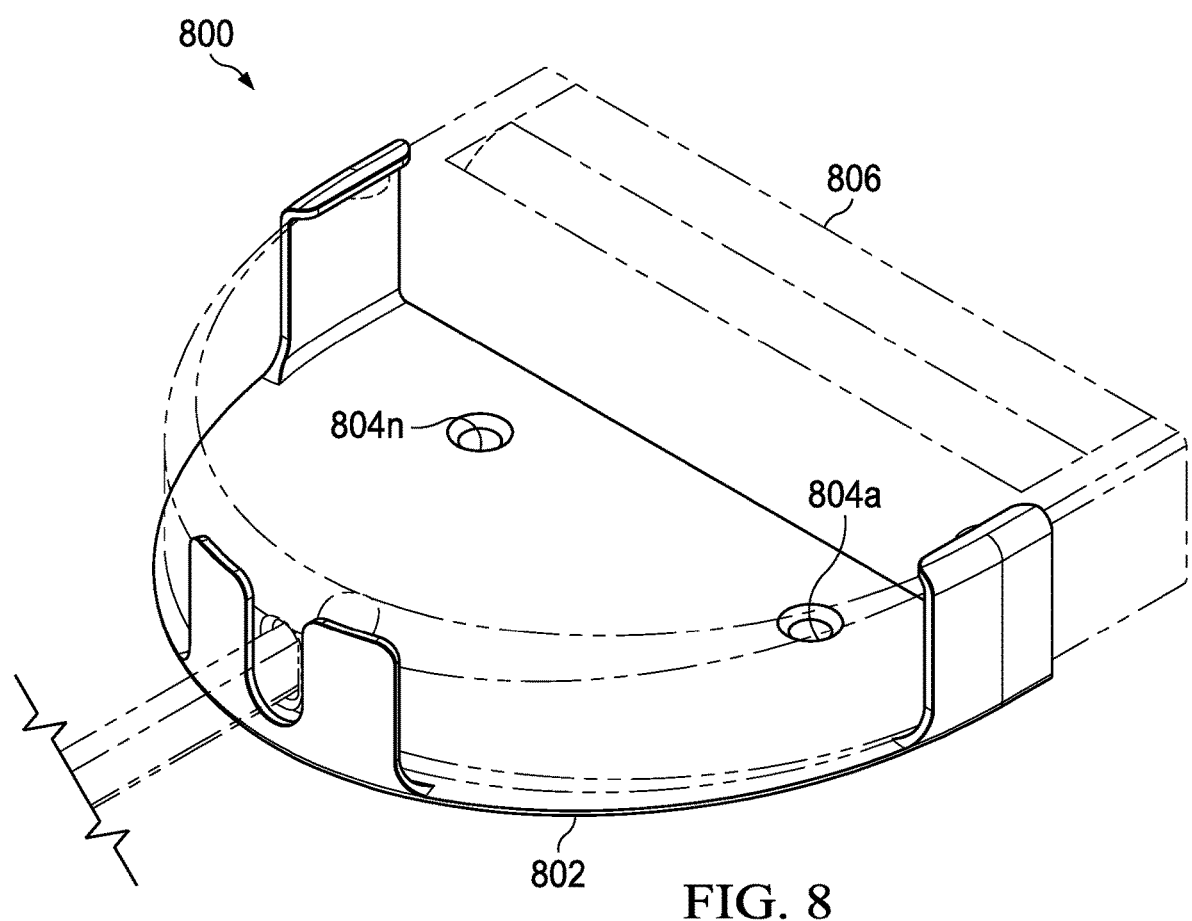
FIG. 8 is an illustration of an illustrative drawing of a connecting mechanism of an extended portion of a relocatable/extendable power adapter.

With regard to FIG. 8, an illustration of an illustrative drawing of a connecting mechanism 800 of an extended portion of a relocatable/extendable power adapter is shown. The connecting mechanism 800 may include a base 802 at least one opening 804*a*-804*n* (collectively 804) through the base 802 for a connecting device, such as a screw, to pass through to mount the connecting mechanism 800 to a wall. The connecting mechanism 800 may be configured to hold an extension adapter unit 806 in place using a bracket, latch, or otherwise. In one embodiment, the extension adapter unit 806 may be slid into the connecting mechanism 800.

Figure 9C:
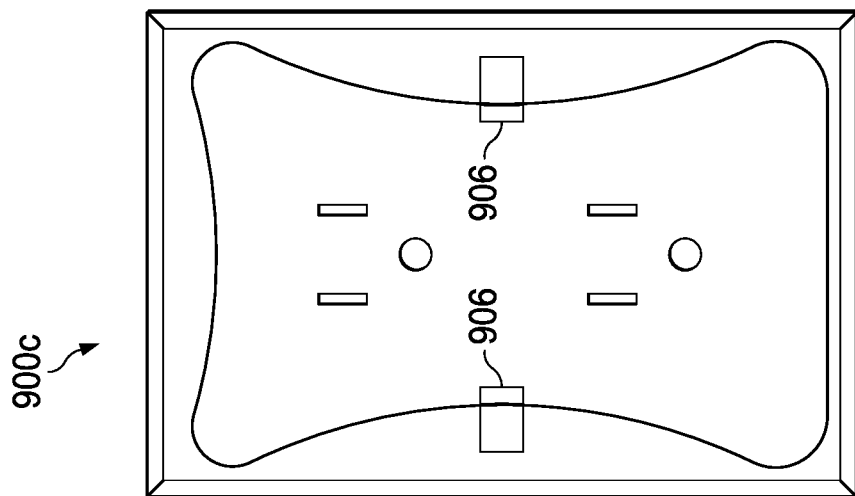
FIGS. 9A-9C are illustrations of an illustrative drawing of a base unit of a relocatable/extendable power adapter.
Figure 9B:
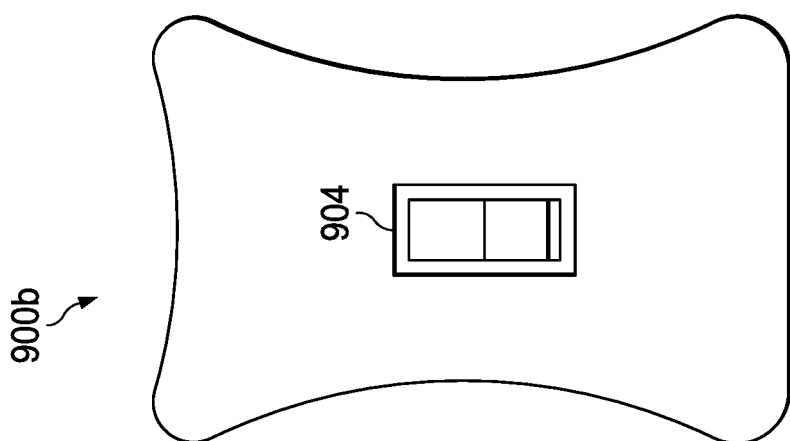
Figure 9A:
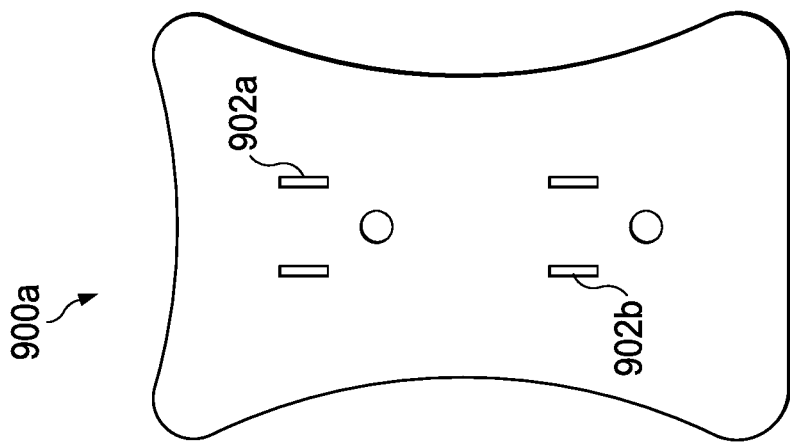

With regard to FIGS. 9A-9C, illustrations of an illustrative drawing of a base unit 900*a*-900*c* (collectively 900) of a relocatable/extendable power adapter are shown. In one embodiment, the base unit 900 may include at least one electrical socket 902*a* and 902*b* (collectively 902). In one embodiment, the base unit 900 may include a switch 904, such as, but not limited to, a light switch. The base unit 900 including the switch 904 may be mounted as a replacement unit inside a wall. In one embodiment, the base unit 900 may include a retractable unit that is held down by at least one latch 906, such as base unit 900*c*. The retractable unit may be configured to be installed within the wall. A user may pull out the retractable unit and attach at least one extension units. In one embodiment, the power adapter may be configured to be at least one of pre-assembled or modular so that the user may add and take away extension units as needed. One of skill in the art will appreciate that any of a plurality of sockets and/or outlets used to power and/or communicate with electrical devices, or any combination thereof, may be included in the base unit 900.

Figure 10A:
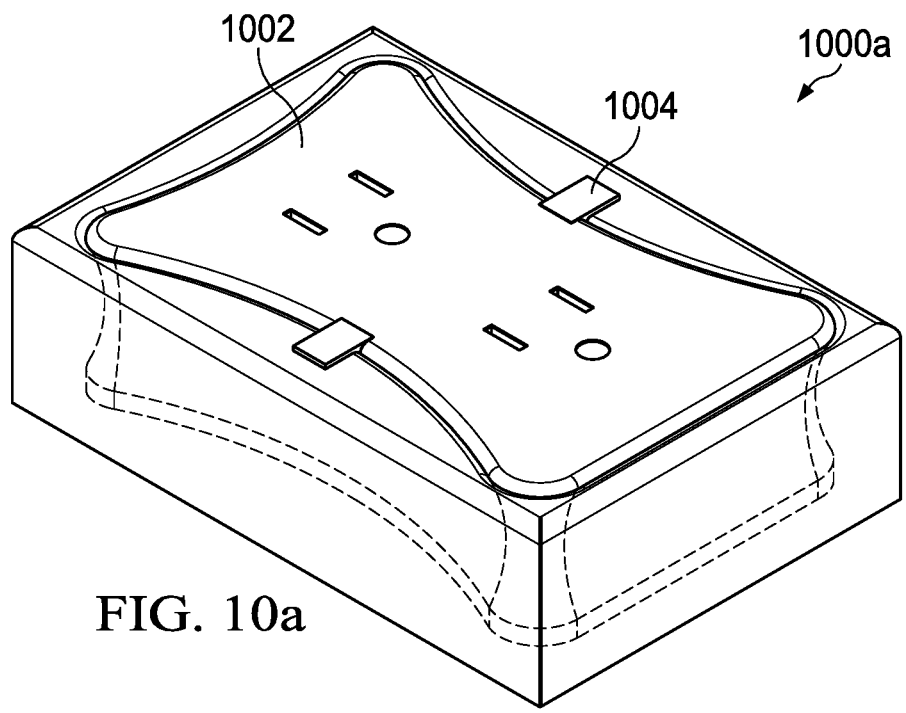
FIGS. 10A and 10B are illustrations of an illustrative drawing of a base unit of a relocatable/extendable power adapter.
Figure 10B:
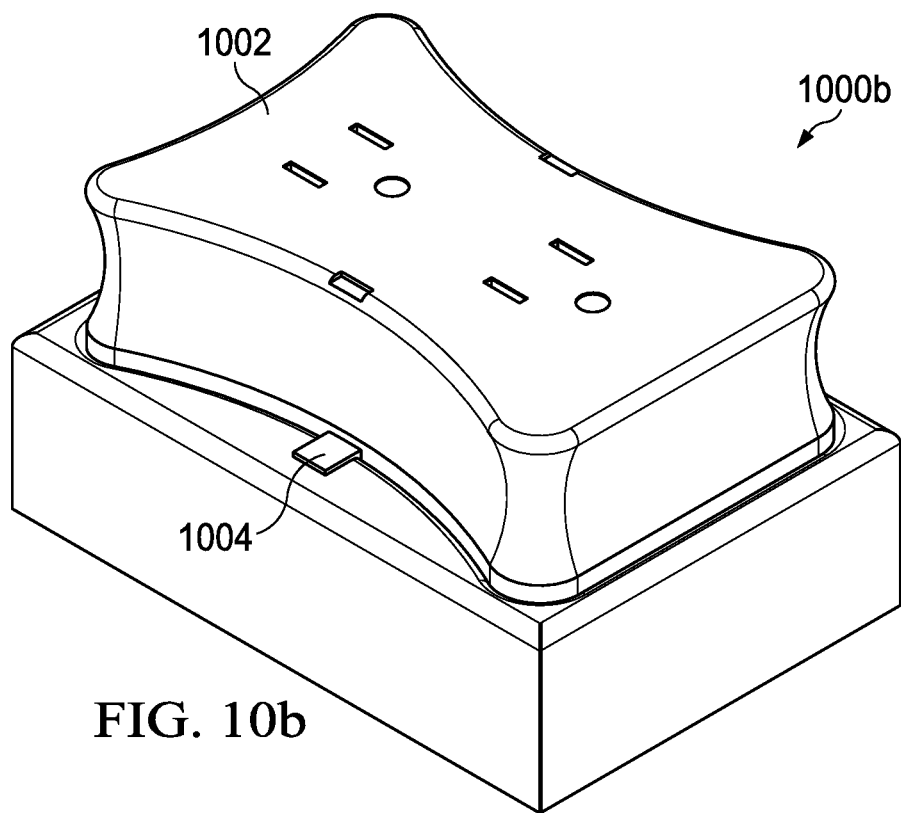

With regard to FIGS. 10A and 10B, illustrations of an illustrative drawing of a base unit 1000*a* and 1000*b* (collectively 1000) of a relocatable/extendable power adapter are shown. The base unit 1000 may be the base unit 900*c* of FIG. 9*c*. The base unit 1000 may include a retractable unit 1002 and at least one latch 1004 configured to hold the retractable unit 1002 in a first positon within the base unit 1002. A user may enable the retractable unit 1002 to extend to a second position so that it may be used with at least one modular extension unit.

Figure 11A:
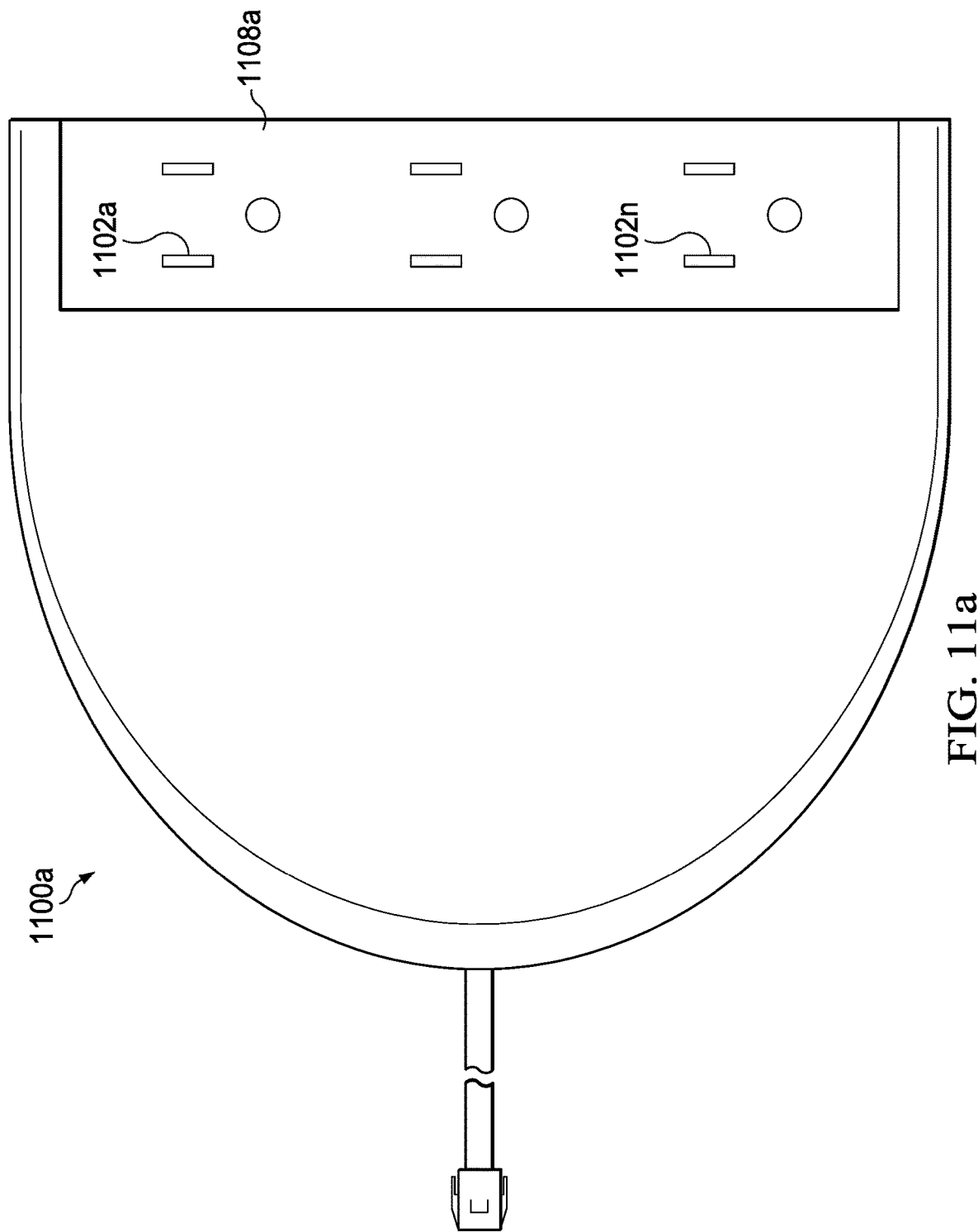
FIGS. 11A-11C are illustrations of an illustrative drawing of an extended unit of a relocatable/extendable power adapter.
Figure 11B:
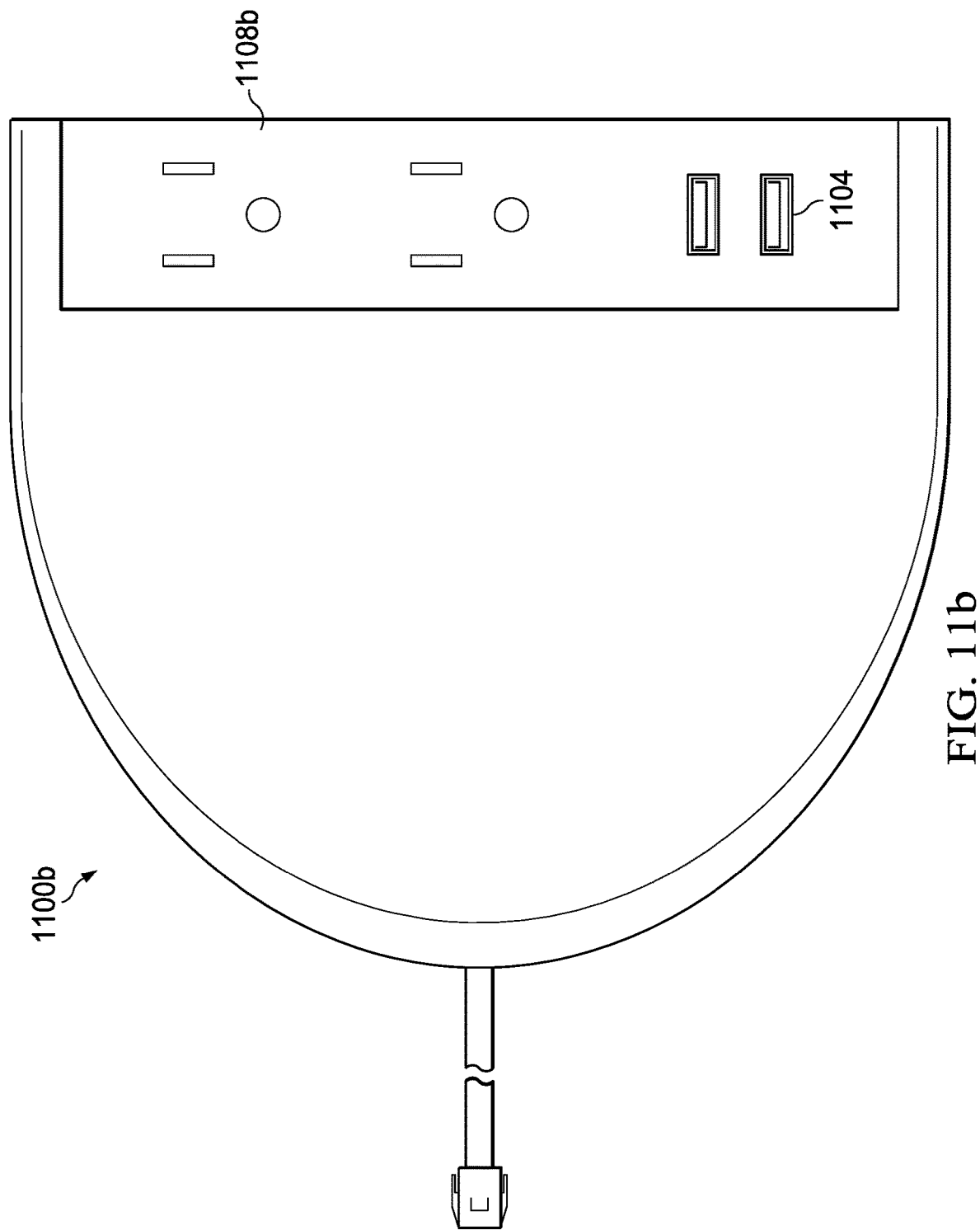
Figure 11C:
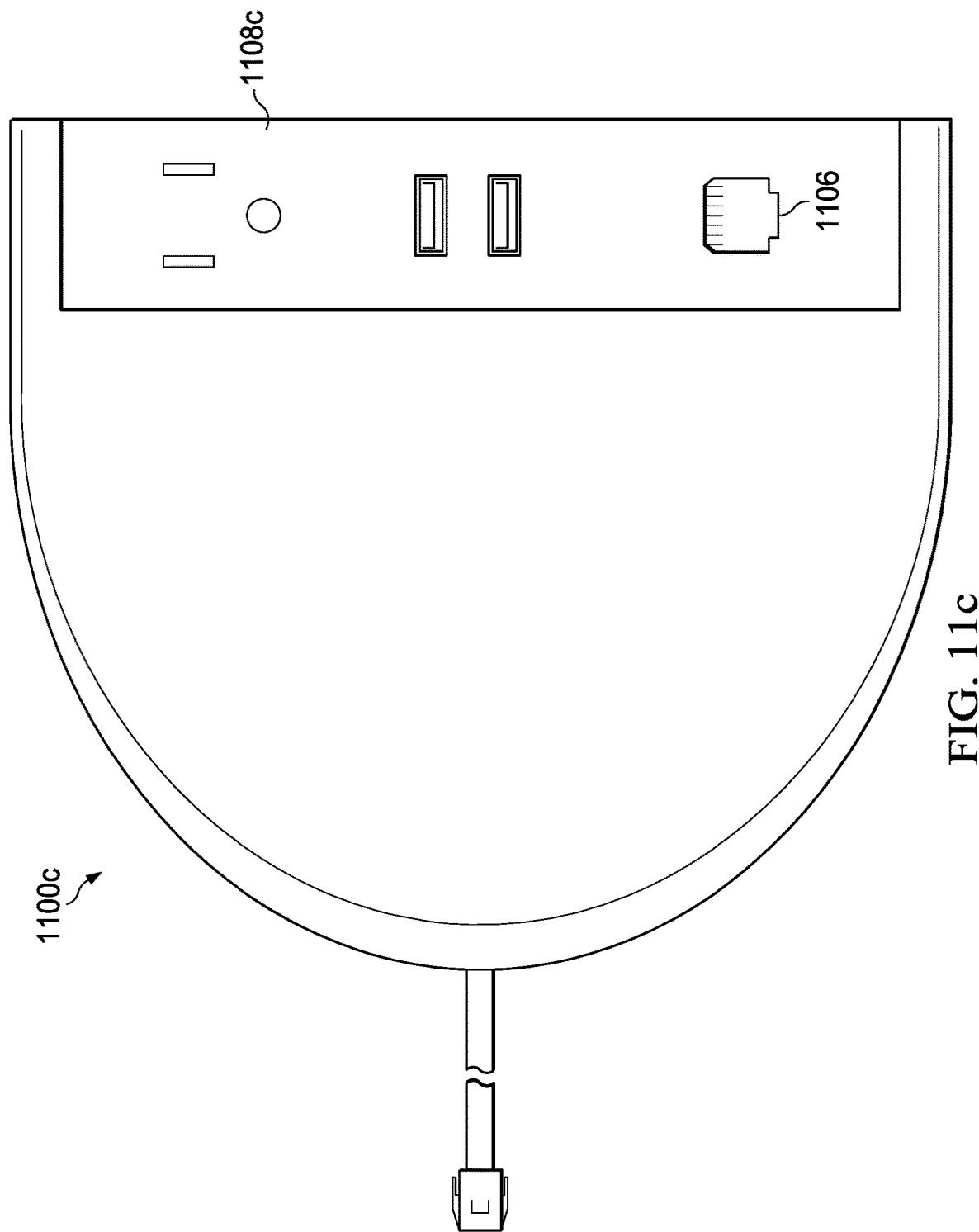

With regard to FIGS. 11A-11C, illustrations of an illustrative drawing of an extended unit 1100a-1100c (collectively 1100) of a relocatable/extendable power adapter are shown. The extended unit 1100 may include at least one of an electrical socket 1102a-1102n (collectively 1102), a universal serial bus (USB) port 1104, and an Ethernet port 1106.

In one embodiment, the extended unit 1100 may also include a rotatable member 1108a-1108c (collectively 1108) configured to house at least one of the at least one electrical socket 1102, the USB port 1104, and the Ethernet port 1106. The rotatable member 1108 may enable a user to rotate the rotatable member 1108 so that the user may access the extended unit in any of a plurality of positions and/or orientations. One of skill in the art will appreciate that any of a plurality of sockets and/or outlets used to power and/or communicate with electrical devices, or any combination thereof, may be included in the extended unit 1100. In one embodiment, the Ethernet port 1106 may be configured to provide power.

Figure 12A:
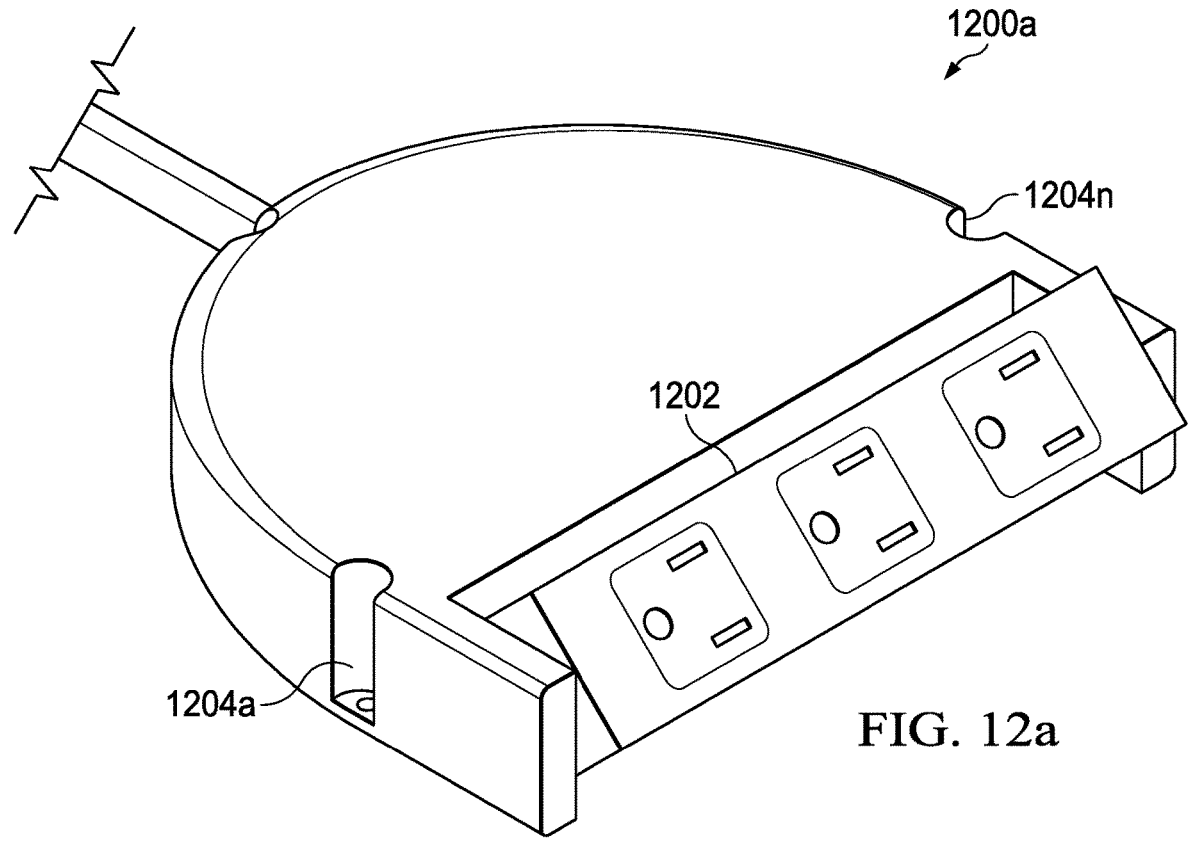
FIGS. 12A and 12B are illustrations of an illustrative drawing of a connecting mechanism of an extended portion of a relocatable/extendable power adapter.
Figure 12B:
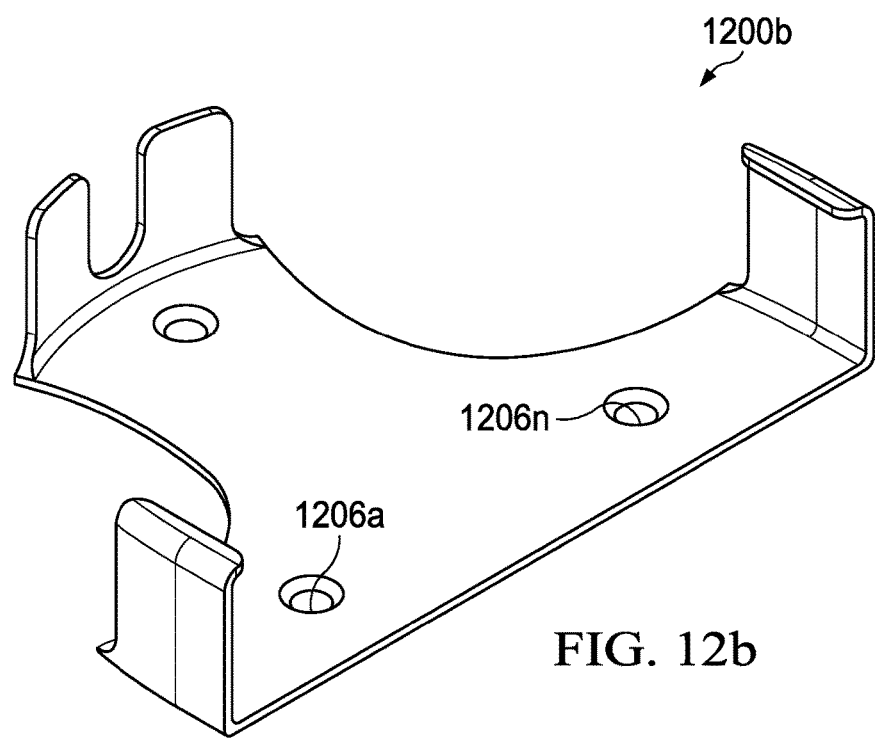

With regard to FIGS. 12A and 12B, illustrations of an illustrative drawing of a connecting mechanism 1200a and 1200b (collectively 1200) of an extended portion of a relocatable/extendable power adapter are shown. The extended portion may include a rotatable member 1202 such as the rotatable member 1108 described hereinabove with regard to FIG. 11. The rotatable member 1202 may be enabled to rotate independently of a connection status of the extended portion.

In one embodiment, the extended portion may include at least one opening 1204a-1204n (collectively 1204) this is configured to allow a connector, such as a screw, to pass through and connect directly to a wall. In one embodiment, a connecting mechanism, such as the connecting mechanism 800 of FIG. 8 described hereinabove, may include at least one opening 1206a-1206n (collectively 1206) for a connecting device or connector, such as a screw, to pass through to mount the connecting mechanism to the wall. The connecting mechanism may be configured to hold the extension unit in place. In one embodiment, the extension unit may be slid into the connecting mechanism.

With regard to FIGS. 13-17C, illustrations of an illustrative drawing of an electrical conduit reel system 1300, 1400a-1400c, 1600a and 1600b, 1700a-1700c (collectively 1300) of an extension unit of a relocatable/extendable power adapter are shown. In one embodiment, the electrical conduit reel system 1300 may include an electrical conductor 1302, 1402, 1602 to supply power to electrical outlets of the extension unit. In one embodiment, the electrical conduit reel system 1300 may include an alternating current to direct current converter 1310 configured to supply power and/or communications to a USB port on the extension unit by a USB cord 1308.

Figure 16A:
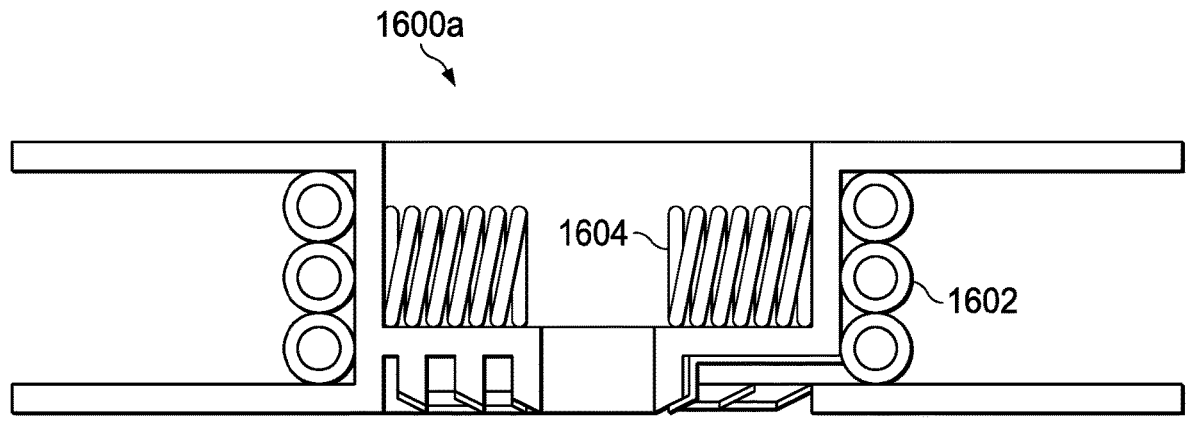
FIGS. 16A and 16B are illustrations of an illustrative drawing of an electrical conduit reel system of a relocatable/extendable power adapter.
Figure 16B:
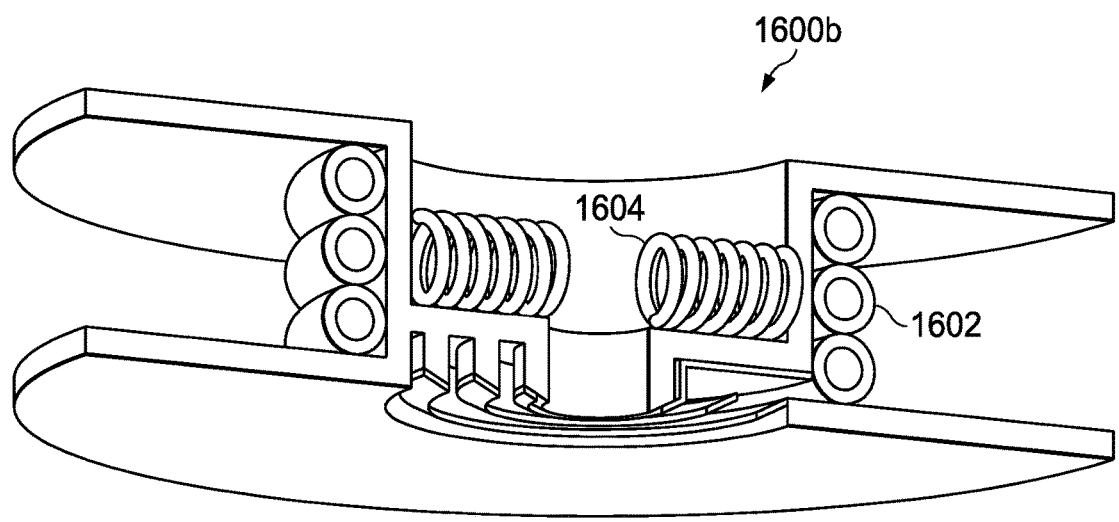
Figure 17A:
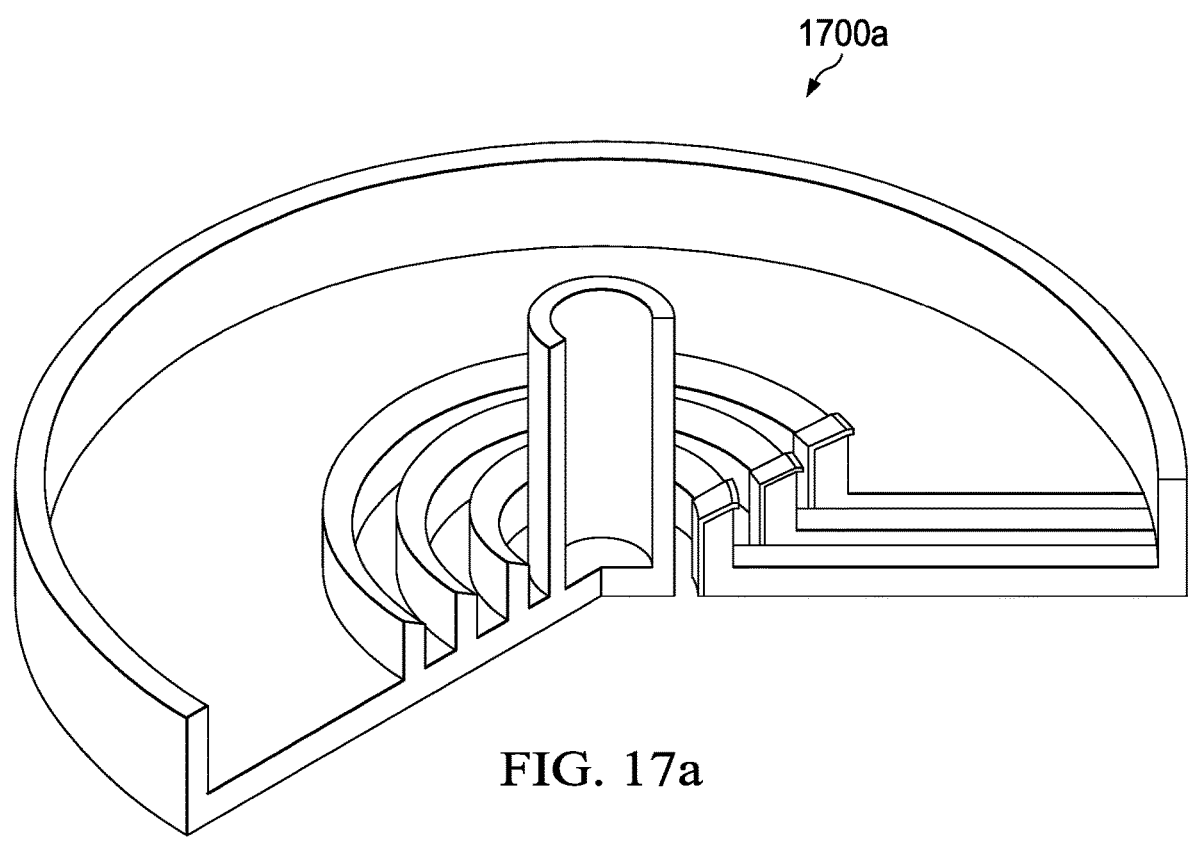
FIGS. 17A-17C are illustrations of an illustrative drawing of an electrical conduit reel system of a relocatable/extendable power adapter.
Figure 17B:
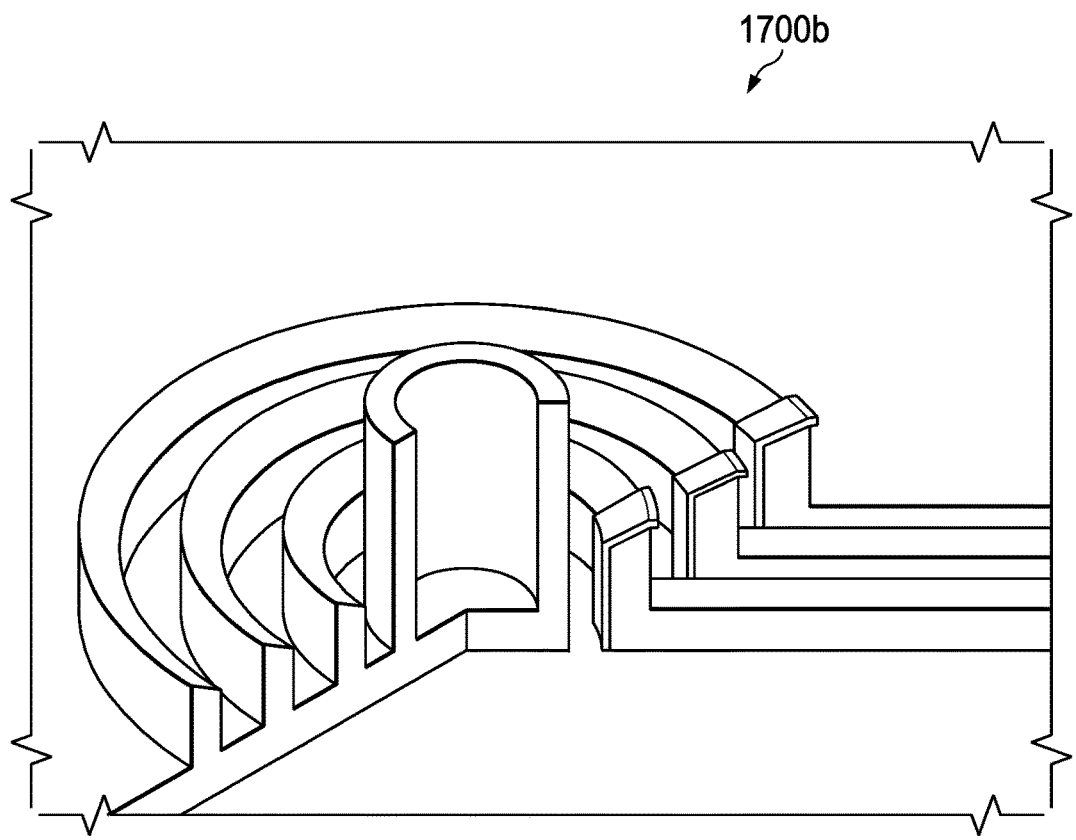
Figure 17C:
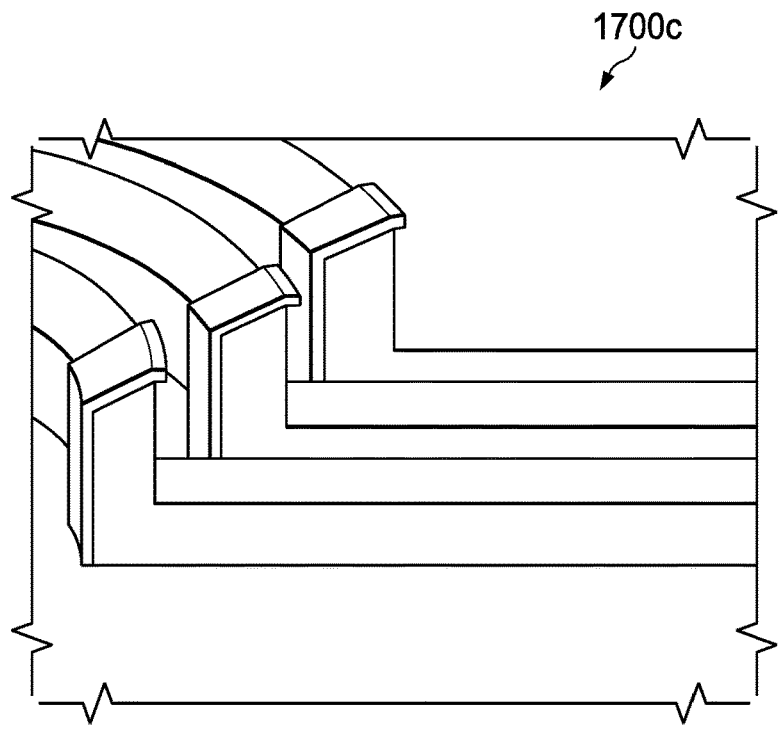

The electrical conduit or conductor reel system (extension adapter unit) 1300 may include an inertial reel 1304, 1500 configured to circularly support an electrical conductor 1306 and enable the electrical conductor 1306 to unravel from a first state to a second state in response to the extension unit being pulled away from a base wall mounted power adapter. The electrical conductor 1306 may be electrically coupled to the extension unit on a first end and to the base wall mounted power adapter on a second end opposite the first end. In one embodiment, the electrical conduit reel system 1300 may also include an inertial reel spring 1604 that is configured to enable the inertial reel 1304, 1500 to unravel. In one embodiment, the electrical conductor 1306 may be configured to ravel into the first state using at least one track system 1404a-1404n (collectively 1404). The electrical conductor reel system 1300 also includes a housing 1312 to house the inertial reel 1304, electrical conductor (e.g., FIG. 14, 1402; FIG. 16, 1602), and other components. As shown, the electrical conductor 1306 may extend through an aperture defined by the housing 1312 so as to extend to a base wall mount adapter, such as base wall mount adapter 202 of FIG. 2.

A method of manufacturing a wall mounted power adapter may include forming a first housing unit and a second housing unit, inserting an electrical conduit reel into the second housing unit, electrically coupling a first end of the electrical conduit reel to the first housing and electrically coupling a second end of the electrical conduit reel to the second housing, and recessing a portion of the second housing unit configured to receive a connecting mechanism for connecting the second housing unit to wall.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The previous description is of a preferred embodiment for implementing the invention, and the scope of the invention should not necessarily be limited by this description. The scope of the present invention is instead defined by the following claims.

What is claimed:

1. A power adapter comprising:
   a base wall mounted power adapter configured to be plugged into a wall power outlet,
   the base wall mounted power adapter including:
   a plurality of sets of electrical conductors, each of the sets of electrical conductors including at least two electrical conductors; and
   a plurality of electrical connectors electrically connected to respective sets of electrical conductors that enable power to be provided to multiple extension adapter units by said base wall mounted power adapter; and
   at least one extension adapter unit electrically coupled to a respective electrical connector of said base wall mounted power adapter and configured to be extended away from the wall power outlet, said at least one extension adapter unit including an electrical conduit reel configured to unravel in response to said at least one extension adapter unit being extended.

2. The power adapter according to claim 1, wherein the electrical conduit reel is coupled to the at least one extension adapter unit on a first end and coupled to the base wall mounted power adapter on a second end opposite the first end.

3. The power adapter according to claim 1, wherein the electrical conduit reel is disposed within a housing of the at least one extension adapter unit in a coiled state.

4. The power adapter according to claim 1, wherein the at least one extension adapter unit is configured to be detachably coupled to the wall.

5. The power adapter according to claim 1, wherein the at least one extension adapter unit includes a rotatable power strip member.

6. The power adapter according to claim 5, wherein the rotatable power strip includes at least two electrical sockets.

7. The power adapter according to claim 1, wherein the electrical conduit reel includes an inertial reel and an inertial reel spring.

8. The power adapter according to claim 1, wherein electrical sockets of the base wall mounted power adapter are configured to have a first position disposed within a housing of said base wall mounted power adapter and a second position protruding from the housing of said base wall power adapter.

9. The power adapter according to claim 1, wherein the at least one extension adapter unit includes at least one of an electrical socket, an Ethernet port, and a universal serial bus port.

10. The power adapter according to claim 9, wherein the Ethernet port is configured to provide power.

11. A method of manufacturing a wall mounted power adapter, comprising:
    forming a first housing unit of the base wall mounted power adapter;
    including a first set of electrical conductors within the first housing unit, the first set of electrical conductors including at least two electrical conductors;
    including a second set of electrical conductors within the first housing unit, the second set of electrical conductors including at least two electrical conductors;
    connecting a plurality of electrical connectors to the first housing unit;
    electrically connecting the first and second sets of electrical conductors to respective electrical connectors to enable power to be provided to multiple extension adapter units;
    forming a second housing unit of an extension adapter;
    attaching an electrical conduit reel with an electrical conduit supported thereby within the second housing unit, the electrical conduit including at least two electrical conductors, the electrical conduit reel enabling electrical conduit to spool therefrom and outside the second housing unit;
    mechanically coupling an outlet to the second housing unit;
    electrically coupling a first end of the at least two electrical conductors of the electrical conduit to the first set of electrical conductors via one of the electrical-connectors, and electrically coupling a second end of the at least two electrical conductors of the electrical conduit to the outlet coupled to the second housing.

12. The method according to claim 11, further comprising connecting the second housing unit to a socket configured to enable the second housing unit to recess therein, the socket further being configured to attach to a wall.

13. A power adapter comprising:
    a base wall mounted power adapter including:
        a first set of electrical conductors including at least two first electrical conductors;
        a second set of electrical conductors including at least two second electrical conductors;
        an electrical plug electrically coupled to said first and second sets of electrical conductors, and configured to be plugged into a wall power outlet; and
        a first housing configured to house said first and second set of electrical conductors and support said electrical plug; and
    at least one extension adapter unit, including:
        a third set of electrical conductors including at least two third electrical conductors electrically coupled to one of said first and second sets of electrical conductors;
        an extension adapter socket configured to enable electrical plugs to be electrically connected thereto;
        an electrical conduit reel configured to circularly support said third set of electrical conductors, and enable said third set of electrical conductors to unravel from a first state to a second state in response to said at least one extension adapter unit being pulled away from said base wall mounted power adapter; and
        a second housing configured (i) to house said third set of electrical conductors and said electrical conduit reel, and (ii) to support said extension adapter socket.

* * * * *